(12) United States Patent
Pitkow et al.

(10) Patent No.: US 6,369,819 B1
(45) Date of Patent: Apr. 9, 2002

(54) METHODS FOR VISUALIZING TRANSFORMATIONS AMONG RELATED SERIES OF GRAPHS

(75) Inventors: James E. Pitkow, Palo Alto; Peter L. T. Pirolli, San Francisco, both of CA (US); Ed H. Chi, Minneapolis, MN (US); Stuart K. Card, Los Altos Hills, CA (US); Jock D. Mackinlay, Palo Alto, CA (US); Rich Gossweller, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/062,513

(22) Filed: Apr. 17, 1998

(51) Int. Cl.[7] ............................. G06T 11/20; G06F 7/00; G06F 17/30
(52) U.S. Cl. ............................. 345/440; 345/853; 707/3
(58) Field of Search .................. 345/440, 356, 345/357, 355, 353, 145, 334, 419, 326, 853, 763, 736, 969, 810, 825; 702/16; 707/3; 703/22

(56) References Cited

U.S. PATENT DOCUMENTS

| | | | | |
|---|---|---|---|---|
| 5,619,632 A | * | 4/1997 | Lamping et al. | 345/356 |
| 5,644,736 A | * | 7/1997 | Healy et al. | 345/357 |
| 5,815,161 A | * | 9/1998 | Emmerink et al. | 345/440 |

(List continued on next page.)

FOREIGN PATENT DOCUMENTS

EP  WO 97/31319  8/1997

OTHER PUBLICATIONS

Stasko et al., "Software Visualization: Programming as a Multimedia Experience", 1998, Massachusetts Institute of Technology.*

(List continued on next page.)

*Primary Examiner*—Matthew Luu
*Assistant Examiner*—Chanté Harrison
(74) *Attorney, Agent, or Firm*—Fliesler Dubb Meyer & Lovejoy LLP

(57) ABSTRACT

A method for displaying in a coherent manner the changes over time of a web site's structure, usage, and content is disclosed. Time tubes are generated by a method of displaying a related series of graphs. Time tubes illustrate changes in a graph that undergoes one or more transformations from one state to another. The transformations are displayed using the length of the cylindrical tube, filling the length of the time tube with planar slices which represent the data at various stages of the transformations. Time tubes may encode several dimensions of the transformations simultaneously by altering the representation of size, color, and layout among the planar slices. Temporal transformations occur when web pages are added or deleted over time. Value-based transformations include node colors, which may be used to encode a specific page's usage parameter. Spatial transformations include the scaling of physical dimension as graphs expand or contract in size. The states of a graph at various times are represented as a series of related graphs. In a preferred embodiment, an inventory of all existing nodes is performed so as to generate a list of all nodes that have existed at any time. This inventory is used to produce a layout template in which each unique node is assigned a unique layout position. To produce each planar slice, the specific nodes which exist in the slice are placed at their respective positions assigned in the layout template. In another aspect, corresponding nodes in planar slices are linked, such as with translucent streamlines, in response to a user selecting a node in a planar slice by placing his cursor over the selected node, or to show clustering of two or more nodes in one planar slice into a single node in an adjacent planar slice.

24 Claims, 29 Drawing Sheets

U.S. PATENT DOCUMENTS

| | | | | | |
|---|---|---|---|---|---|
| 5,877,766 | A | * | 3/1999 | Bates | 345/356 |
| 6,002,401 | A | * | 12/1999 | Baker | 345/335 |
| 6,054,989 | A | * | 4/2000 | Roertson et al. | 345/355 |
| 6,151,595 | A | * | 11/2000 | Pirolli et al. | 707/3 X |
| 6,154,213 | A | * | 11/2000 | Rennison et al. | 345/356 |
| 6,222,559 | B1 | * | 4/2001 | Asano et al. | 345/440 |
| 6,223,145 | B1 | * | 4/2001 | Hearst | 703/22 |

OTHER PUBLICATIONS

Carriere, Jeromy and Kazman, Rick, "Research Report: Interacting with Huge Hierarchies: Beyond Cone Trees," Proceedings of Information Visualization Symposium, Oct. 30–31, 1995, Atlanta Georgia, pp. 74–81.

Hill, William and Holland, Jim, "Edit Wear and Read Wear," Proceedings of CHI, 1992, pp. 3–9.

Lamping, John and Rao, Ramana, "Laying Out and Visualizing Large Trees Using a Hyperbolic Space," Proceedings of UIST 1994, Nov., 1994, pp. 13–14.

Mukherjea, Sougata and Foley, James D., "Visualizing the World–Wide Web with the Navigational View Builder," *Computer Networks and ISDN Systems*, 1995, pp. 1075–1087.

Pitkow, James and Bharat, Krishna A., "Webviz: A Tool for World–Wide Web Access Log Analysis," Proceedings of the First International World–Wide Web Conference, May 1994, Entire article.

G. Wills "Niche Works—Interactive Visualization of Very Large Graphs," 1998 Lucent Technologies, Bell Laboratories.

Chi, E. "Cybervis Project Report: Visualization of the World–Wide Web" 1997 Xerox Parc User Interface Research Group.

Douglis, F., et al., "Webguide: Querying and Navigating Changes in Web Repositories", *Computer Networks an ISDN Systems, N.L., North Holland Publishing, Amsterdam*, vol. 28, No. 7/11, May 1996, pp. 1335–1344.

Pirolli, P., et al., "Silk from a Cow's Ear: Extracting Usable Structures from the Web," Proceedings on CHI '96, 'Online!, Jul. 11, 1996, Retrieved from the Internet: °URL: http://www.acm.org/sigchi/chi96/proceedings/papers/Pirolli_2/pp2.html<, pp.1–10.

* cited by examiner

| FROM NODE \ TO NODE | 1 | 2 | 3 | 4 | 5 | 6 | 7 | 8 | 9 |
|---|---|---|---|---|---|---|---|---|---|
| 1 | 0 | 1 | 0 | 1 | 0 | 0 | 0 | 0 | 0 |
| 2 | 1 | 0 | 1 | 0 | 1 | 0 | 0 | 0 | 0 |
| 3 | 0 | 1 | 0 | 0 | 0 | 1 | 0 | 0 | 0 |
| 4 | 1 | 0 | 0 | 0 | 1 | 0 | 1 | 0 | 0 |
| 5 | 0 | 1 | 0 | 1 | 0 | 1 | 0 | 1 | 0 |
| 6 | 0 | 0 | 1 | 0 | 1 | 0 | 0 | 0 | 1 |
| 7 | 0 | 0 | 0 | 1 | 0 | 0 | 0 | 1 | 0 |
| 8 | 0 | 0 | 0 | 0 | 1 | 0 | 1 | 0 | 1 |
| 9 | 0 | 0 | 0 | 0 | 0 | 1 | 0 | 1 | 0 |

METHODS FOR VISUALIZING TRANSFORMATIONS AMONG RELATED SERIES OF GRAPHS

CROSS-REFERENCE TO RELATED APPLICATIONS

This Application is related to the following Applications, which were filed of even date herewith:

(1) "Usage Based Methods of Traversing and Displaying Generalized Graph Structures," by Ed H. Chi, et al., Ser. No. 09/062,341; and (2) "Methods for Interactive Visualization of Spreading Activation Using Time Tubes and Disk Trees," by Peter L. T. Pirolli, et al., Ser. No. 09/062,540.

BACKGROUND OF THE INVENTION

1. Field of the Invention

The present invention is related to the field of displaying a related series of generalized graph structures. Specifically, the present invention is related to displaying changes over time of structure and parameters of a generalized graph structure, and the present invention is related to displaying relationships between the related series of graphs. The present invention addresses the problem of coherently displaying the changes in structure, content, and usage of World Wide Web pages of a web site.

2. Discussion of the Related Art

The World-Wide Web ("web") is perhaps the most important information access mechanism to be introduced to the general public in the 20th Century. As larger numbers of organizations rely on the Internet to distribute information to potential consumers and investors, they also realize its potential for distributing and organizing large volumes of data for later retrieval by employees and business partners. A company's web site is rapidly becoming one of its most important business investments.

As an information repository, a web site generally receives a high amounts of usage. Web site usage patterns that are derived by monitoring the how the company's employees use its web site enhance the companies understanding of its business activities. For example, monitoring what product literature the sales force is downloading may be a way to forecast sales. In short, traditional market analysis can be applied to this information resource.

Analysts are interested in not just how the web pages are used, but as well as the context under which they are placed, such as the linkage structure and the web page content. A web site is a dynamic structure, because its topology as evidenced by its linkage structure, the contents of its pages, and its usage changes continually. Analysts want to be able to analyze the evolving web site.

Because of analysts increasing desire to discover and understand users' access patterns, relationships between web page contents, and to efficiently structure web sites'topology, a need exists for a set of visualization tools which aid in the process of web site analysis.

The topology, content, or usage of a web site may be modeled at any given time as a generalized graph structure having various parameters associated with the various nodes and/or links. In order to enable effective cognitive processing of the changes over time in a web site, a need exists for displaying the change over time in a coherent manner to a web site designer, administrator, or analyst.

SUMMARY OF THE INVENTION

A conventional technique for understanding a graph structure is to display a representation of the links and nodes which constitute the graph structure. One view of the World Wide Web is that of a graph structure, with web pages representing nodes and hyperlinks representing the links between the nodes. The various pages which make up a web site frequently change over time in structure, usage, and content. The structure, usage, and content of the web pages in a web site at any given time may be modeled as a graph. An object of the present invention is to provide a method for displaying in a coherent manner the changes over time of a web site's structure, usage, and content.

According to the present invention, time tubes are generated by a method of displaying a related series of graphs. Time tubes according to the present invention are especially well suited for use as a web site analysis tool. Although the usefulness of time tubes according to the methods of the present invention is illustrated using the example of web site analysis, the methods are applicable to all fields involving evolving graph structures. For example, telecommunication systems, physical transport systems, such as highways, trains, and the like, and manufacturing systems can all be modeled as graphs and analyzed using time tubes.

Time tubes illustrate changes in a graph that undergoes one or more transformations from one state to another. In the preferred embodiment, the transformations are displayed using the length of the cylindrical tube, filling the length of the time tube with planar slices which represent the data at various stages of the transformations. Time tubes may encode several dimensions of the transformations simultaneously by altering the representation of size, color, and layout among the planar slices which make up the time tube.

Examples of the transformations that time tubes can display include, but are not limited to, temporal, value-based, and spatial transformations. Temporal changes occur when web pages are added or deleted over time. Value-based changes include node colors, which may be used to encode a specific page's usage parameter, as measured by its visitation rate. Spatial changes include the scaling of physical dimension as graphs expand or contract in size.

According to the present invention, the states of a graph at various times are represented as a series of related graphs. The same nodes may exist in some or all of the graphs. According to the preferred embodiment the method of displaying the related series of graphs, an inventory of all existing nodes is performed so as to generate a list of all nodes that have existed at any time. This inventory is used to produce a layout template in which each unique node is assigned a unique layout position. To produce each planar slice, the specific nodes which exist in the slice are placed at their respective positions assigned in the layout template. Then the planar slices are displayed.

In another aspect of the present invention, corresponding nodes in planar slices are linked, such as with translucent streamlines. In the preferred embodiment of the present invention, this linking is performed in response to a user selecting a node in a planar slice by placing his cursor over the selected node, such that the nodes in other planar slices corresponding to the user's selected node are displayed. This linking also may be performed so as to show clustering of two or more nodes in one planar slice into a single node in an adjacent planar slice.

Furthermore, because a time tube is a cylindrical log, it can be rotated along its central axis to move specific nodes closer to the user's viewpoint. Because time tubes exist in a three dimensional work space, the user can change his viewing perspective for time tube, such as zooming into or out of an area of interest.

These and other features and advantages of the present invention are apparent from the Figures as fully described in the Detailed Description of the Invention.

BRIEF DESCRIPTION OF THE DRAWINGS

FIG. 7 illustrates a topology matrix corresponding to the generalized graph structure shown in FIG. 6.

Figure 1:
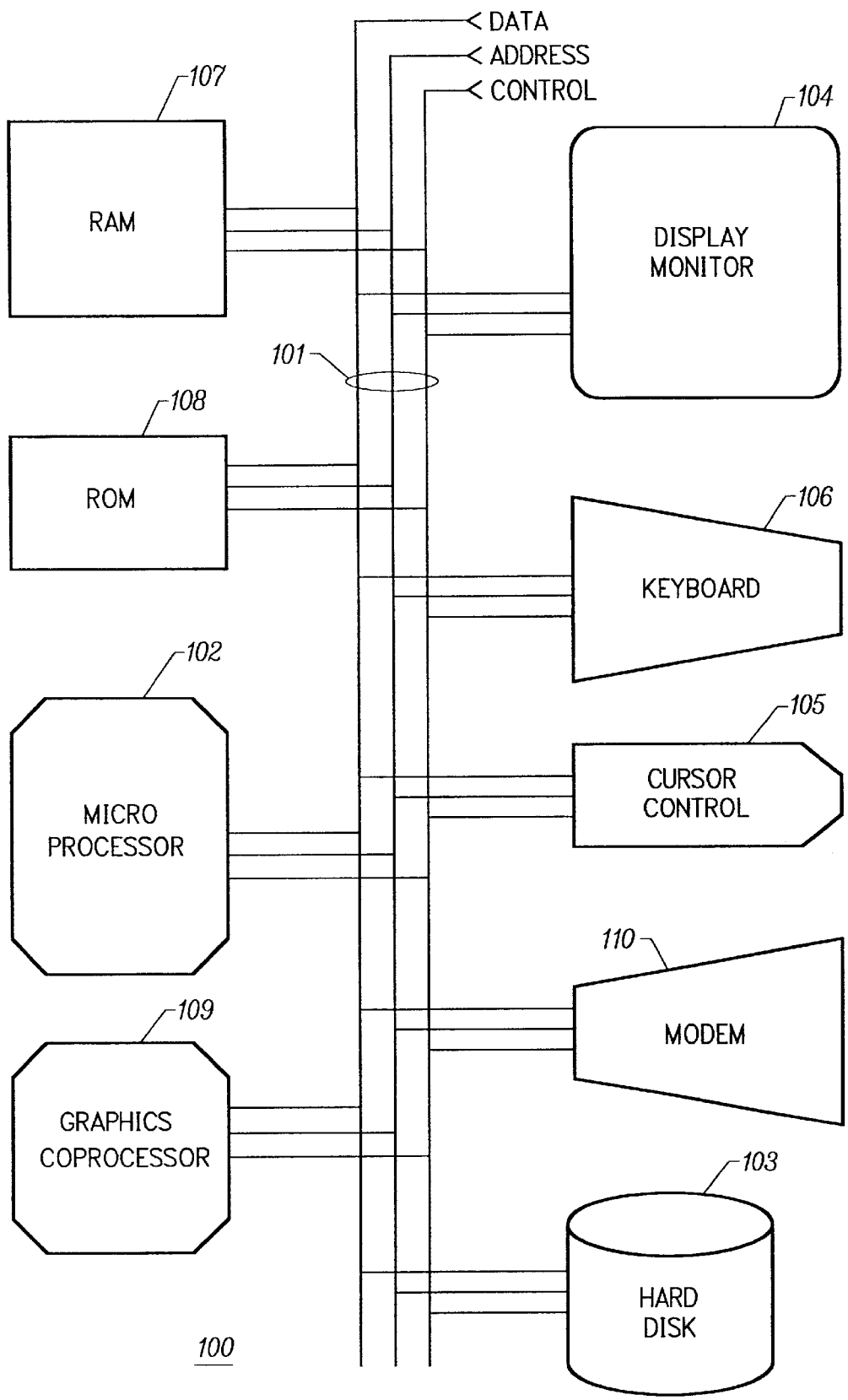
FIG. 1 illustrates a general purpose computer suitable for performing the methods of the present invention.

The Figures are more fully explained in the following Detailed Description of the Invention. In the Figures, like reference numerals denote the same elements; however, like parts are sometimes labeled with different reference numerals in different Figures in order to clearly describe the present invention.

DETAILED DESCRIPTION OF THE INVENTION

The world wide web is a complex large directed graph. Visualizing a general directed graph is well-known and difficult problem. In fact, none of the current graph layout algorithms can deal with a 7,000-node graph in a reasonable manner. However, as a subdomain of directed graph, web site linkage structures tend to be rather hierarchical. That is, while a web site is not a tree, a tree representation often approximates a web site well.

In analyzing the linkage structure of the web, an analyst may often be concerned in finding the shortest number of hops from one document to another. Breadth-first traversal transforms the web graph into a tree by placing a node as closely to the root node as possible. After obtaining this tree, the structure is then visualized using the disk tree visualization technique. A disk tree uses a circular layout to visualize the hierarchy. Each successive circle denotes levels in the tree. The layout algorithm runs in two passes. In the first pass, the algorithm traverses the entire hierarchy using post-order traversal. At each node, the algorithm calculates the number of leaf nodes in that sub-tree. So the total number of leaves in the tree is known. The algorithm then calculates the amount of angular space to be allocated for each leaf node (360 degrees divided by the total number of leaves). In the second pass, the algorithm traverses the hierarchy using breadth-first traversal. At each node, it allocates the amount of angular space for that node by looking to see how many leaf nodes are rooted at that sub-tree. In this manner, each leaf node is guaranteed a fixed amount of angular space.

A viewer can gain increased understanding of visualizations if the choices made in mapping data into visual presentations is performed intelligently and strategically. The disk tree has several advantages. First, the structure of the tree is visualized compactly, with the pattern easily recognizable. Second, when viewed straight on or at slight angles, there are no occlusion problems since the entire layout lies on a two dimensional plane. Third, unlike cone trees, since it is a two dimensional technique, the third dimension can be utilized for other information, such as time, or a three dimensional glyph at each node. Lastly, the circularity is aesthetically pleasing to the eye.

The visualization itself actually validates the choice of a preferred breadth first transformation algorithm. The high traffic areas are usually concentrated near the root node. This means that the algorithm places easy to reach nodes starting from the root node. As the document gets farther and farther away from the root node, the document has a lesser possibility of being accessed.

FIG. 1 illustrates a general purpose computer architecture 100 suitable for implementing the methods according to the present invention. The general purpose computer 100 includes at least a microprocessor 102, a display monitor 104, and a cursor control device 105. The cursor control device 105 can be implemented as a mouse, a joy stick, a series of buttons, or any other input device which allows a user to control position of a cursor or pointer on the display monitor 104. The general purpose computer may also include random access memory 107, external storage 103, ROM memory 108, a keyboard 106, a modem 110 and a graphics co-processor 109. All of the elements of the general purpose computer 100 may be tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 102, RAM 107, ROM 108, and graphics co-processor 109 might be tied together with a data bus while the hard disk 103, modem 110, keyboard 106, display monitor 104, and cursor control device 105 are connected together with a second data bus (not shown). In this case, the first data bus 101 and the second data bus (not shown) could be linked by a bidirectional bus interface (not shown). Alternatively, some of the elements, such as the microprocessor 102 and graphics co-processor 109 could be connected to both the first data bus 101 and the second data bus (not shown) and communication between the first and second data bus would occur through the microprocessor 102 and graphics co-processor 109. The methods of the present invention are thus executable on any general purpose computing architecture such as the 100 illustrated in FIG. 1, but there is clearly no limitation that this architecture is the only one which can execute the methods of the present invention.

Figure 2:
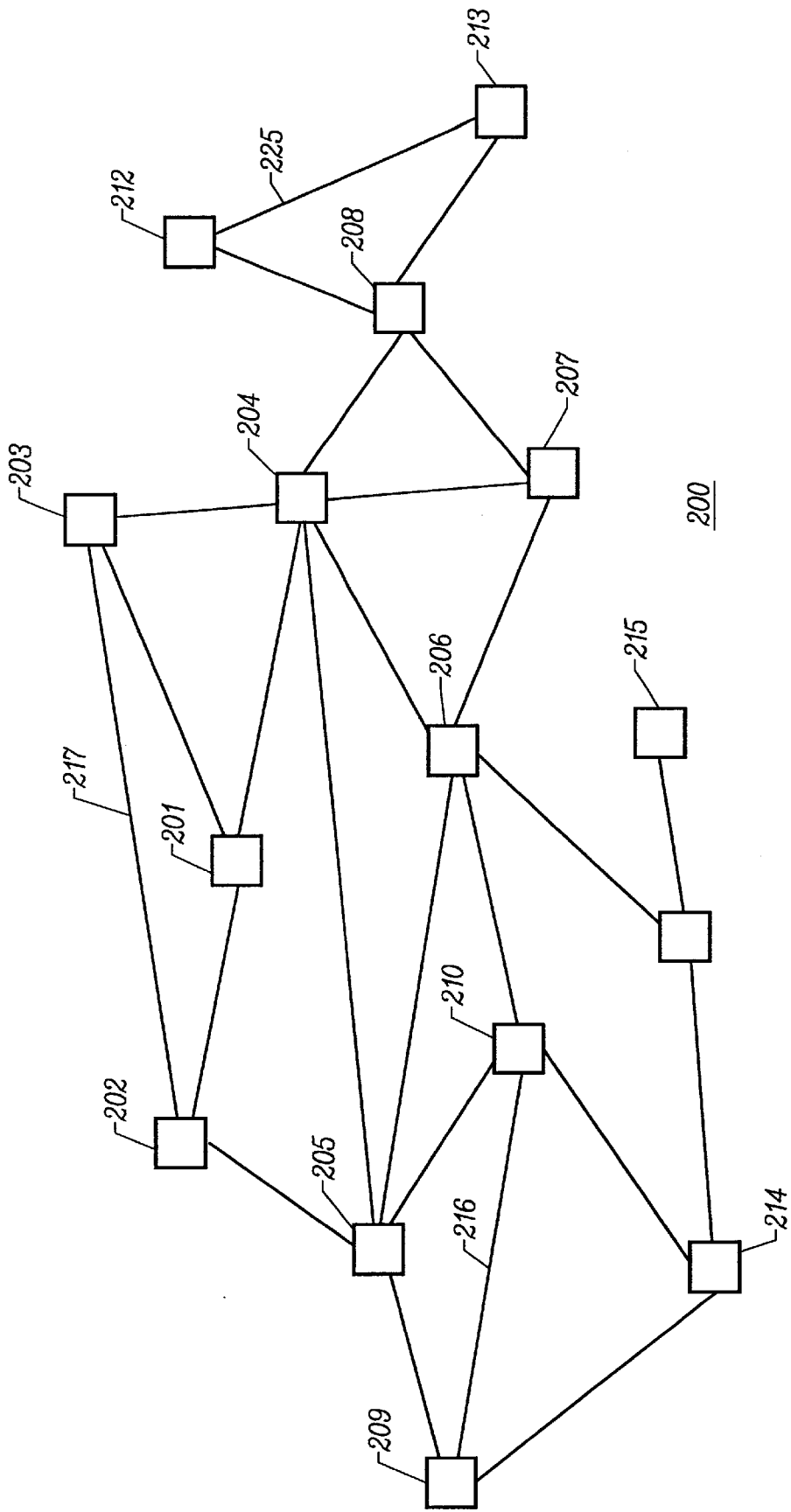
FIG. 2 illustrates a generalized graph structure.

FIG. 2 illustrates a generalized graph structure 200 consisting of fifteen nodes 201 through 215. The various nodes 201 through 215 of the generalized graph structure 200 are connected to each other by links, such as those labeled 216 through 225. The links connecting the various nodes may either bidirectional or unidirectional. Throughout this patent document and in all of its Figures, a bidirectional link will be represented as a link having no arrows at either end, and a unidirectional link will be denoted by a link having an arrow at one end or the other, which will indicate that a link exists only in the direction that the arrow is pointing. For example, link 217 in FIG. 2 represents the ability to move from node 202 to node 203, as well as the ability to move from node 203 to node 202. Clearly, several alternative routes exist for moving from a node to another node. Because of the large number of links in a large generalized graph structure, often it is impractical to display all of the links. Therefore, when presenting a user with a visual representation of a generalized graph structure, only a subset of all links that exist in the generalized graph structure are displayed. The subset of links which is chosen for display must show a path from every node in the generalized graph structure to every other node in the generalized graph structure. A tree structure is often used to accomplish this goal.

Figure 3:
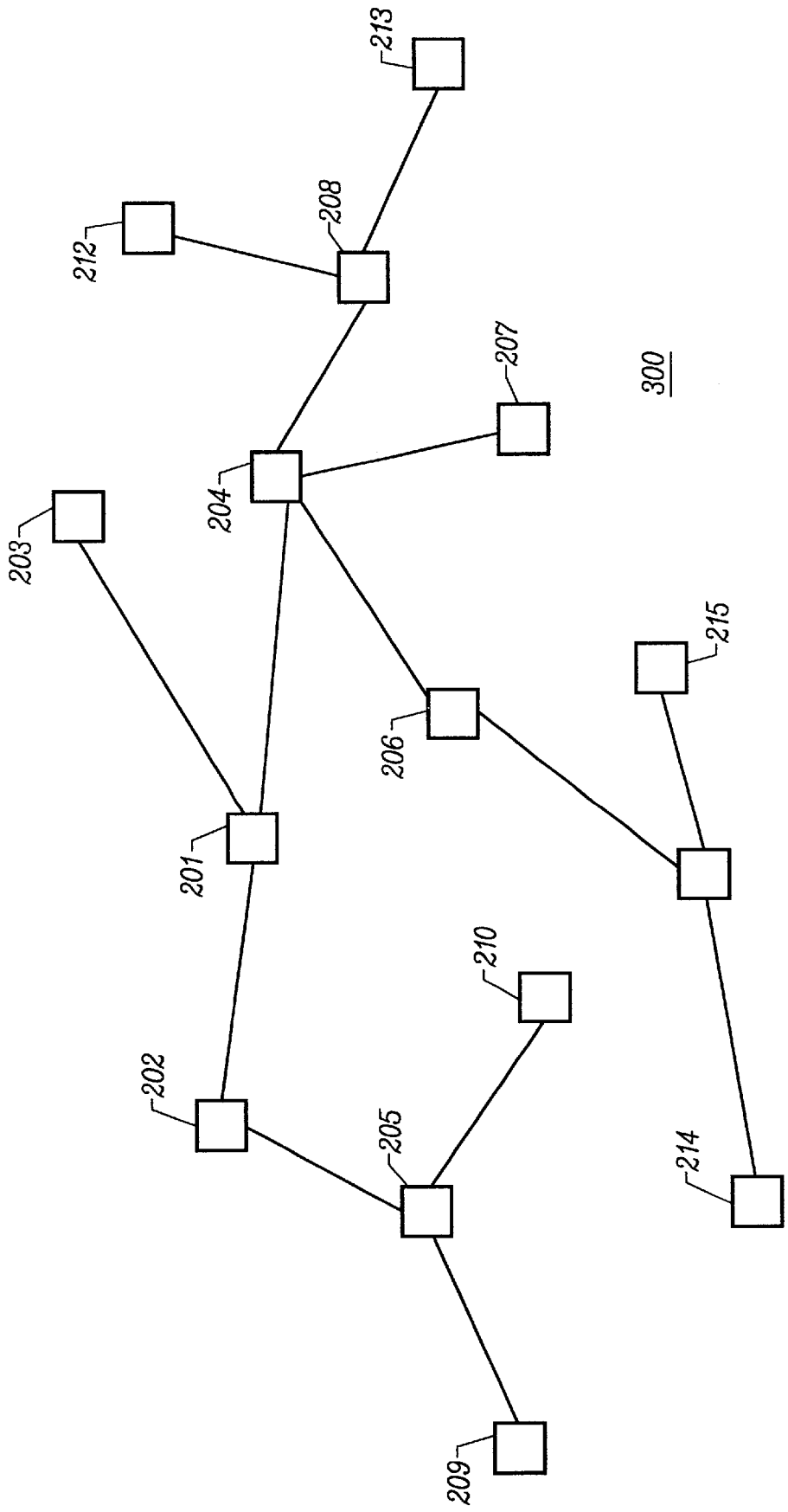
FIG. 3 illustrates a tree structure generated from the generalized graph structure illustrated in FIG. 2.

FIG. 3 illustrates a tree structure representation 300 of the generalized graph structure 200 illustrated in FIG. 2. Links 216 through 225 are not shown in the tree structure 300 corresponding to the generalized graph structure 200. Links 216 through 225 were omitted because they create cycles in the generalized graph structure 200. A tree structure has no cycles; in other words, there is only one path from any node to any other node. In the tree structure representation 300, there is only one path from any node to any other node because all cycles have been broken.

Figure 4:
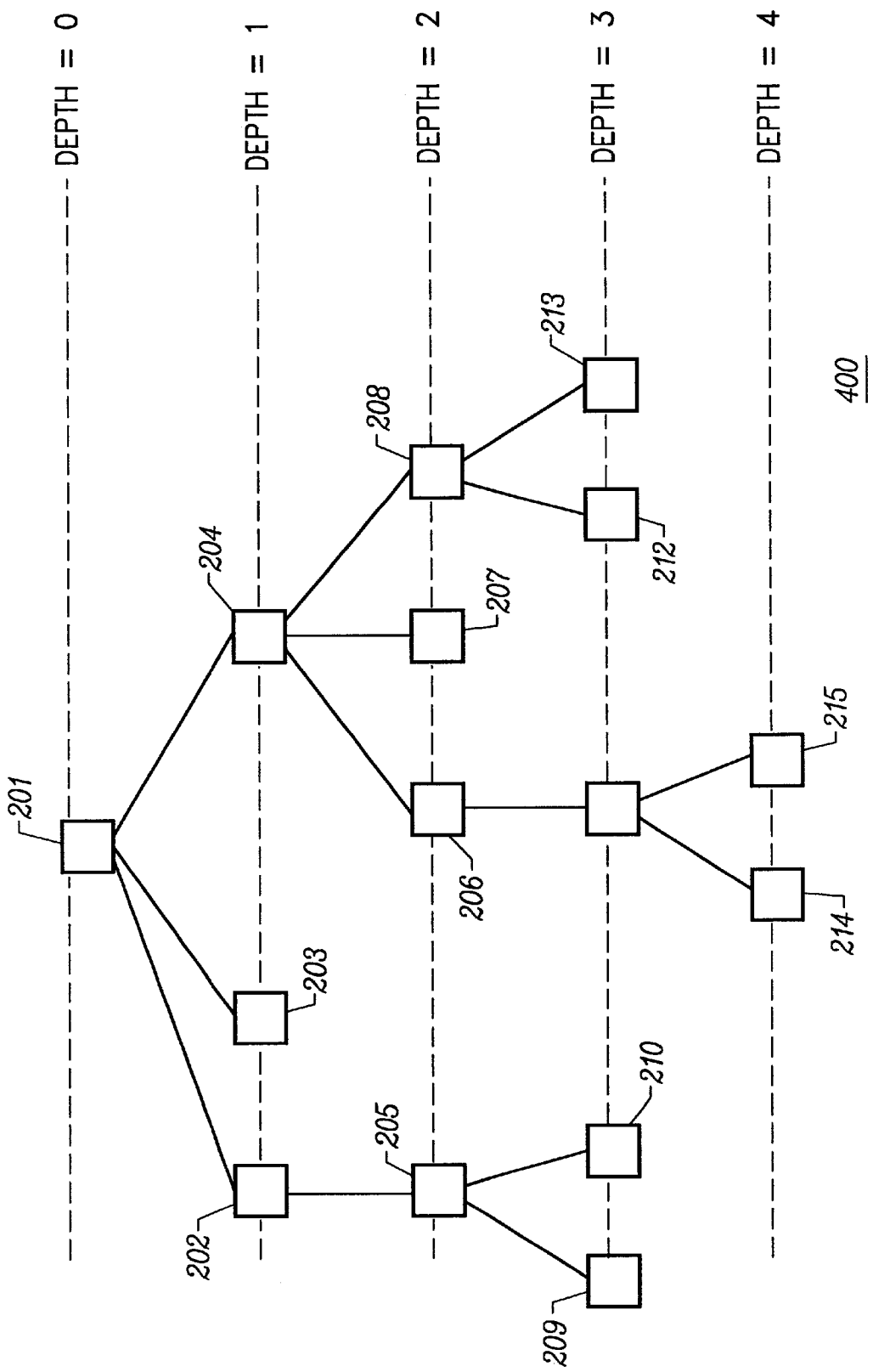
FIG. 4 is another illustration of the tree structure shown in FIG. 3 which shows the depth of each node.

FIG. 4 shows another tree structure representation 400 of the tree structure representation 300 illustrated in FIG. 3. In the tree structure 400, node 201 is identified as the root node. The root node 201 has a depth of zero. The children of the root node 201 are nodes 202, 203, and 204, which exist at a depth of one. Node 202 has one child (node 205) and node 204 has three children (nodes 206, 207, and 208). Nodes 205 through 208 are at depth two. The depth of any node is determined by the number of links which must be traversed in order to travel back to the root node. Nodes 209, 210, 203, 214, 215, 207, 212, and 213 are leaf nodes, because they have no children.

Figure 5:
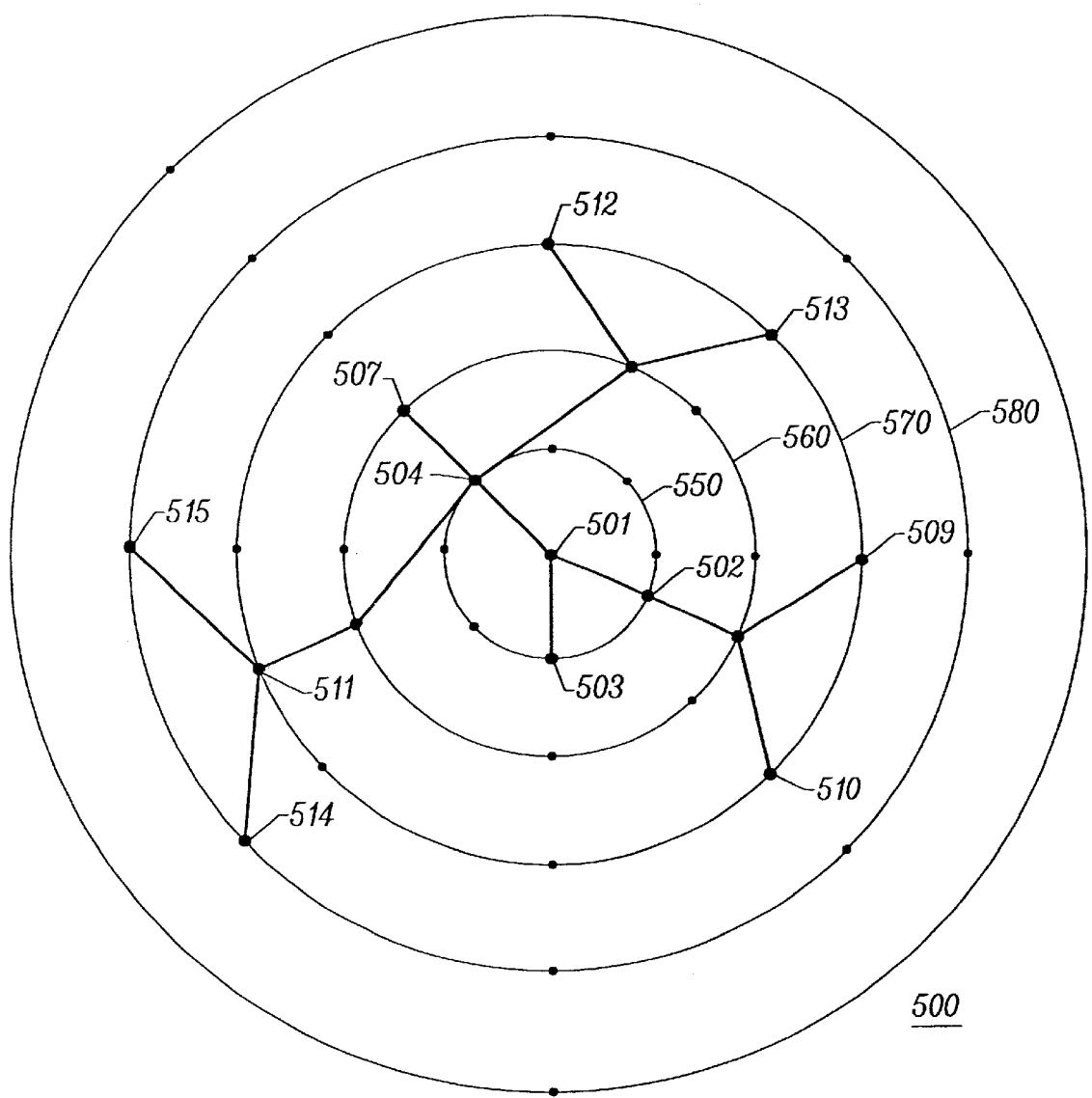
FIG. 5 illustrates a disk tree representation of the tree structure shown FIGS. 3 and 4.

FIG. 5 illustrates a disk tree representation 500 of the tree structure 400 shown in FIG. 4. The center point 501 of the disk tree representation 500 corresponds to the root node 201 of the tree structure 400. Each of the points 501 through 515 represents one of the nodes 201 through 215. Specifically, by adding 300 to the reference numeral associated with each node of the tree structure 400, the reference numeral corresponding to the point in the disk tree 500 for each node of the tree structure 400 is computed. In other words, node 201 in FIG. 4 is illustrated as node 501 in the disk tree 500, node 202 is represented by point 502, node 203 is represented by point 503, and node 215 is represented by point 515. Circle 550 contains all points which represent nodes that are at a depth of one from the root node represented by point 501. Circle 560 contains all points representing nodes at depth two. Circle 570 contains all points representing nodes at depth three, and circle 580 contains all points representing nodes at depth four. (The points in FIG. 5 display and represent the nodes of FIG. 4; thus the term node is sometimes used hereinafter used to refer to the point on a display representing a node.) The angular placement of each point representing a node in the disk tree 500 is determined as follows. The total number of leaf nodes is determined, and the 360° of the circle is divided by that total number of leaf nodes. In the case of disk tree 500, there are eight leaf nodes represented by points 512, 513, 509, 510, 503, 514, 515, and 507. Each leaf node thus has 45° of angular space dedicated to it in the disk tree 500. The angular placement of a parent node is the angle which bisects the angle formed by its outer most leaf nodes and the root node. For example, point 504 representing node 204 has outer most leaves 214 and 213, which correspond to points 514 and 513, respectively, on disk tree 500. The angle formed by an outer most leaf 514, the outer most leaf point 513, and the root node 501 is 180°. Therefore, the angle of parent node 504 is the angle bisecting that 180° angle. Similarly, parent point 511 has children points 515 and 514. The children points 515 and 514 together with the root node 501 form a 45° angle, therefore parent point 511 is placed at an angle which bisects that 45° angle.

According to the present invention, the layout of graph structures is performed based upon usage information. Whereas conventional layout methods are based primarily upon either topology or content, the methods according to the present invention encode additional information by prioritizing (or ranking) usage. These methods provide degree of interest functions for graph visualizations, thereby minimizing cognitive load. While the scope of the present invention extends far beyond applications to the web, the web is used to exemplify the methods according to the present invention.

The present invention addresses the problem of laying out large directed graphs, such as found in the world wide web, so that the relevant relationships are exposed. According to the present invention, a usage based traversal turns a general graph into a tree. The order of traversal or order of layout or both are chosen based upon usage data such as simple frequencies or cocitation frequencies. Using the methods of the present invention, an intranet view for a company can be dynamically organized.

According to the present invention, additional information is encoded into graph visualizations by laying out graphs based on usage-based information. For example, in information retrieval, hypertext documents are accessed in various frequencies (some are more popular than others). According to the present invention, the popularity of an item helps determine the priority the item will receive in the layout of the graph. By coupling the usage data and encoding it into the structural layout of the graph, changes in usage and topology can be viewed at the same time.

While the scope of the proposed invention is not limited to documents on the world wide web, the web as viewed by an administrator of a web site is used as an example to ground the concepts of the present invention. The present invention allows web administrators in charge of maintenance to understand the relationship between a web site's usage patterns and its topology.

A traditional technique for understanding a complex link structure is to present a visualization or representation of the links and nodes. One view of the Web is that of a graph, with documents representing nodes and hyperlinks representing the links between documents. Because of the complexity and sheer number of links, some information is usually filtered or culled to enable effective cognitive visual processing. To ensure that the layout algorithm presents the more important information, these algorithms often employ degree-of-interest functions.

No conventional systems modify the layout of items based upon their usage characteristics. Web site maintenance personnel and content designers have a need to understand the relationship between the site's usage patterns and its link topology, and vice versa. Since Web sites are dynamic and change over time, maintenance personnel often need to understand how changes to the topology affect usage. By using information from usage patterns, layout algorithms can present a site's topology, reveal how users' paths and usage changes over time (for example., as more users access the structure, as their needs change, and as the underlying topology evolves).

The methods according to the present invention employ usage information to make layout decisions for a variety of layout algorithms. Some of these algorithms attempt to maximize screen real estate while others function by trying to reveal subtle relationships amongst the elements. Frequency, recency, spacing of accesses, and path information are all forms of usage information which can be referenced according to the methods of the present invention. Additionally, derived usage information like need odds and cocitation clustering can also be used, though the present invention is not limited to only these forms.

One method to layout a topology according to the present invention involves starting with a node, called the root node, and spreading out the links radially about the node. The ancillary nodes then repeat until the screen real estate is consumed. To optimally layout the nodes, the layout algorithm may wish to place the highest-used nodes farthest apart from each other so that they have the most growth space. The lowest-used nodes are then placed in the remaining space between the high-usage nodes. The layout continues to place nodes the farthest apart from each other based upon usage values, around the hub. The highest used nodes are optimally separated from each other allowing plenty of screen real estate for their related children nodes to be placed. This is done at the expense of the less used nodes.

Another layout method according to the present invention orders the nodes by usage and then lays them out from high to low (or low to high) to reveal popularity (or deadwood).

As an example of usage-based layout, a modified breadth first traversal of a graph according the present invention encodes usage in its structure. In a traditional breadth-first traversal based layout, the immediate children of the root node are laid out, then their children. Conventionally, the order in which the children are visited is not specified in the traversal. However, according to the present invention, additional information is encoded into the graph layout simply by choosing a visitation order based on some parameter. For example, the visitation order is determined by sorting nodes based on the amounts of usage (favor popular web pages over less popular ones).

Another layout algorithm that can be modified to reference usage parameters according to the present invention is depth-first traversal, in which nodes in a common ancestry are presented. In this alternative, a vertical slice is presented at the cost of missing nearby neighbors. At each step, the algorithm must determine which children to choose to explore. Similar to the best breadth-first traversal according to the present invention, the child that has the highest usage is visited first.

Many other layout combinations are possible according to the present invention. For example, instead of walking the graph in a breadth-first or depth-first topological order from a given node, all nodes with a given usage level are displayed as root nodes. With respect to the web, this technique can be used to visualize the set of entry points (the pages people use to enter a site) and the subsequent paths of users from those pages. Then the space between them is allocated based on usage and linkage between the root nodes.

Usage patterns not only reveal how a document structure is being accessed over an aggregated time-period, but also when collected over time, reveal a flow through the topology. This adds another dimension to the representation. The maintenance personnel can see how usage is changing over time (perhaps due to user changes or external events) and how structural changes affect usage patterns. Comparing these time slices allow the maintenance personnel to discover not only how many people and where they are currently traversing the structure, but also to correlate changes.

Figure 6:
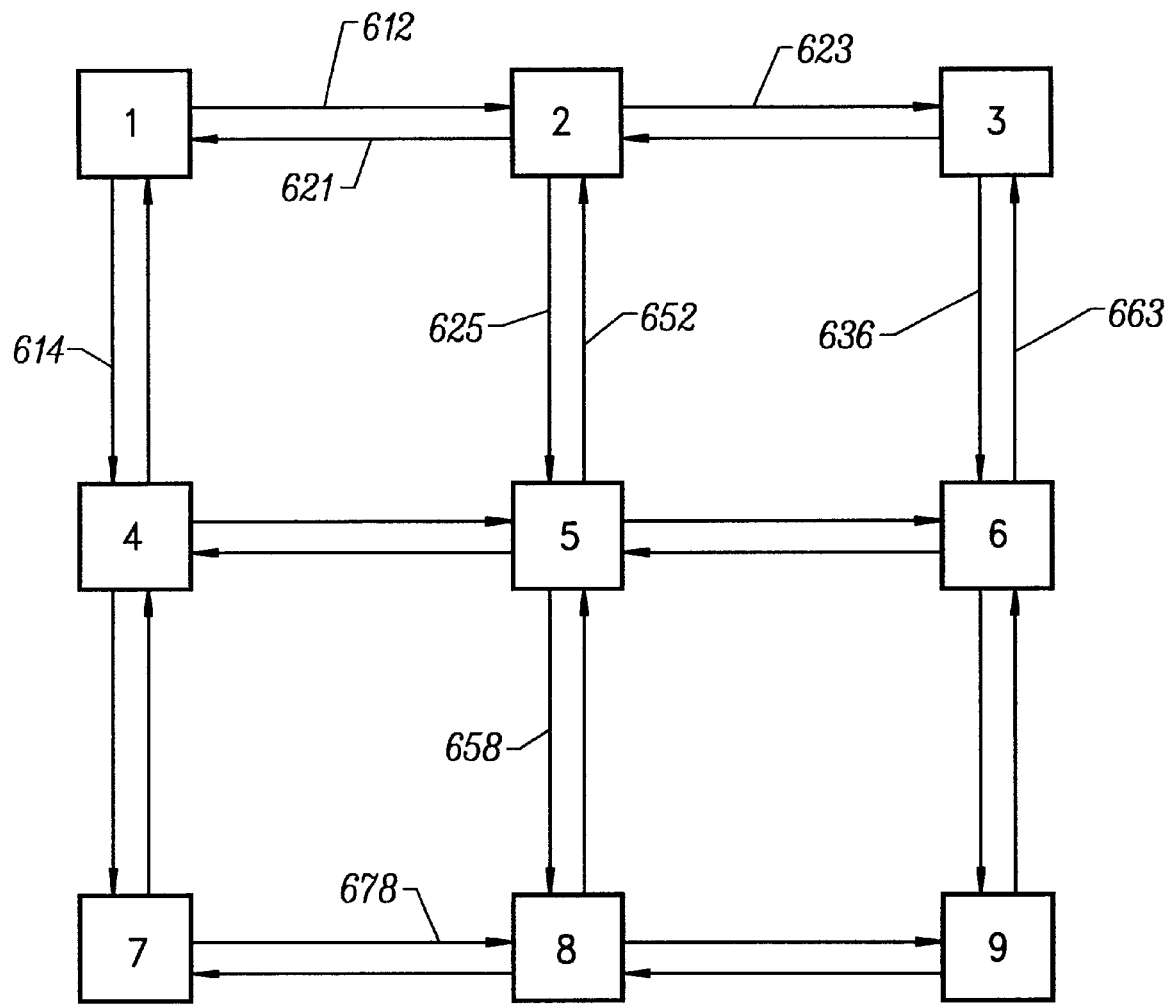
FIG. 6 illustrates a generalized graph structure having nine nodes and containing many cycles which will be used to illustrate various usage based tree structure generation methods according to the present invention.

FIG. 6 illustrates a generalized graph structure having nine nodes, 1 through 9, and containing many cycles which will be used to illustrate various usage based tree structure generation methods according to the present invention. For the sake of clarity, bidirectional links between nodes are represented as a pair of unidirectional links. For example, node 1 has a link 612 to node 2, and node 2 has a link 621 to node 1.

FIG. 7 illustrates a topology matrix 700 corresponding to the generalized graph structure 600. Rows 1 through 9 of the topology matrix 700 correspond to nodes 1 through 9, and columns 1 through 9 of the topology matrix 700 correspond to nodes 1–9. A topology matrix entry at row i and column i represents the existence or absence of a link from node i to node j. For example, node 6 has a link 663 to node 3, and node 7 has a link 678 to node 8. Thus, the existence of a link from node i to node j is represented as a 1 at row i, column j of the topology matrix 700. The absence of a link from node i to node j in the generalized graph structure 600 is represented as a 0 in the row i, column j topology matrix 700. A topology matrix is generally square, because it specifies linkages from each node to every other node in a generalized graph structure. Diagonal entries of the topology matrix are always zero. Because the links in the generalized graph structure 600 are bidirectional, the topology matrix 700 is symmetric about its diagonal, although there is no requirement that this be the case.

Figure 8:
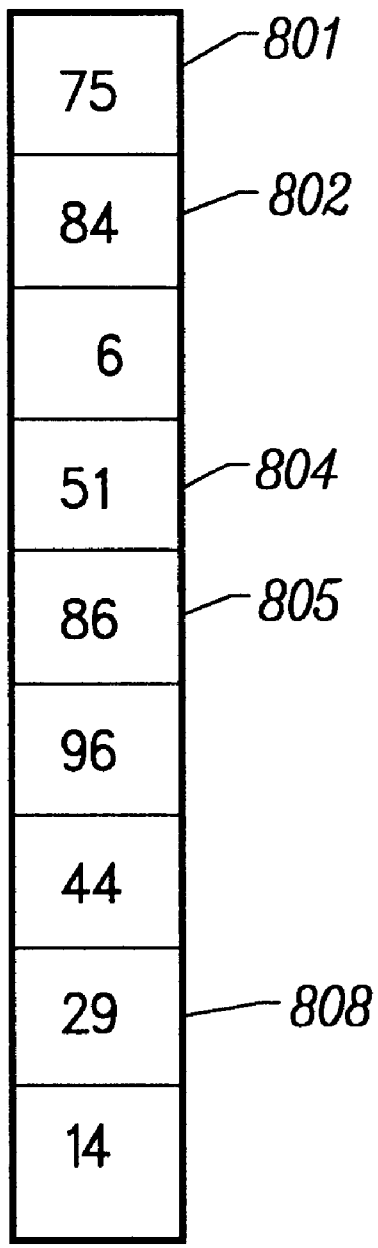
FIG. 8 illustrates a usage parameter vector pertaining to the nodes of the generalized graph structure shown in FIG. 6.

FIG. 8 illustrates a usage parameter vector 800 corresponding to the generalized graph structure 600 shown in FIG. 6. The usage parameter for node 1 is 75 at entry 801 of the usage parameter vector 800. Similarly, the usage parameter associated with node 8 is 29 and is found in entry 808 of the usage parameter vector 800. Thus, the usage parameter vector 800 is simply a list of usage parameters associated with each node of a generalized graph structure. Generally, an N node generalized graph structure will have an N entry usage parameter vector associated with it. The usage parameters in the usage parameter vector 800 thus correspond to measured usages of the corresponding nodes. For example, if each of nodes 1 through 9 in the generalized graph structure 600 represent web pages in a nine page web site, then the usage parameter associated with each node could be used to represent the average number of accesses per day of each particular web page in the web site. Alternatively, the user parameter associated with each node could represent the sums of the amounts of time that the various users who accessed the page kept the page open. This alternative usage parameter would encode the total dwell time measured by all users who access the page in a given fixed time period. The quantity which is encoded by the usage parameter associated with each node can be computed in a variety of separate ways, each of which measures a different type of usage. The methods according to the present invention are applicable to any usage parameter that can be conceived and computed for each node. Therefore, the present invention is not limited to any single type of usage parameter, such as frequency or dwell time. Usage parameters are most likely normalized to some predefined scale. For example, the usage parameters illustrated in FIG. 8 are normalized to a scale from 0 to 100. Usage parameters could alternatively be normalized, for example, from 0 to 1, or from −1024 to +1024.

Figure 9:
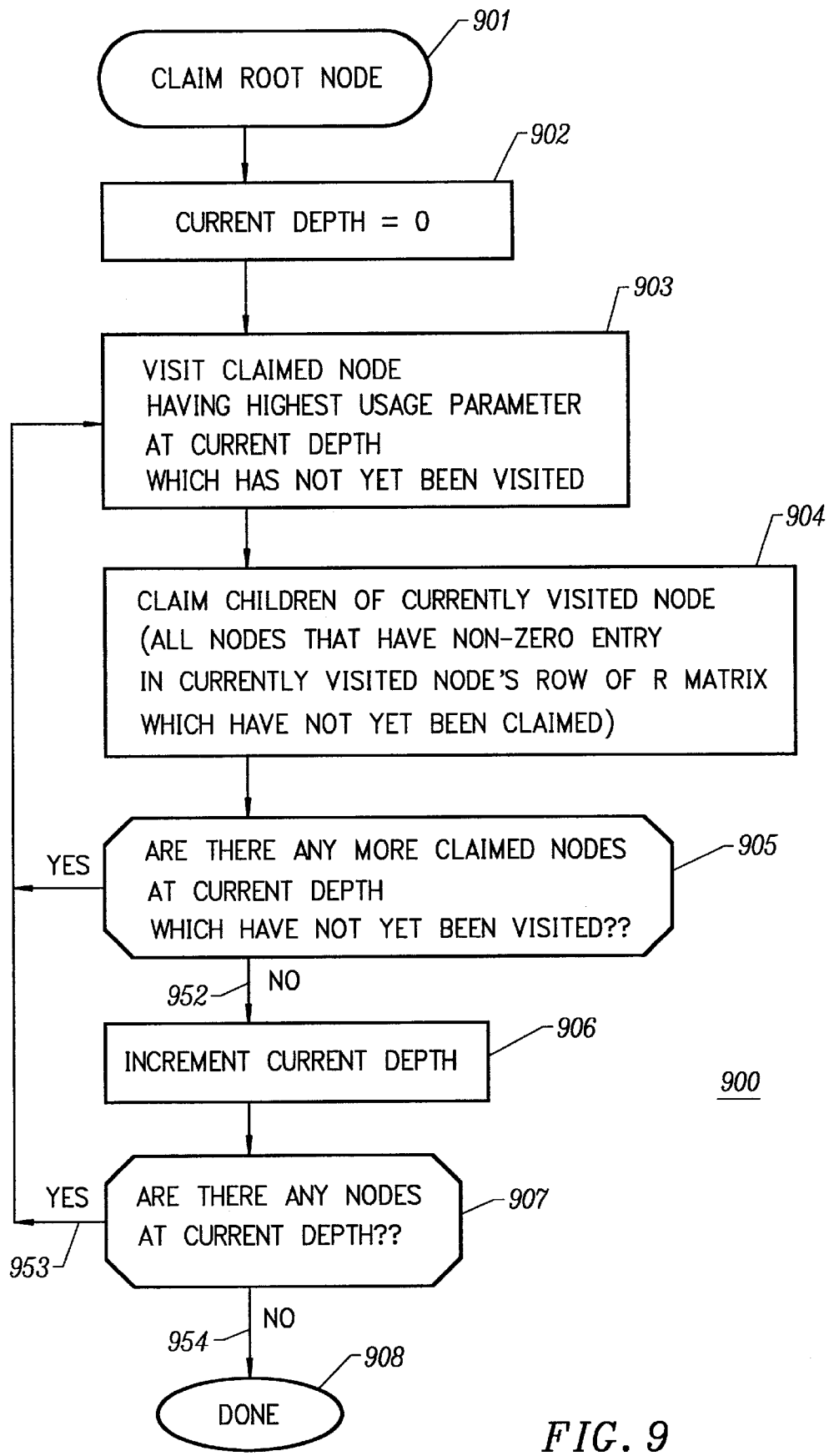
FIG. 9 illustrates a breadth first method for generating a tree structure from a generalized graph structure according to the present invention.

FIG. 9 illustrates a usage-based breadth first method 900 for generating a tree structure from a generalized graph structure according to the present invention. The method 900 begins at step 901 with the claiming of a root node. In order to generate a tree structure by a breadth first algorithm, the root node must be specified so that the depth of any node can be calculated relative to the root node. The claiming of the root node in step 901 can occur by a variety of mechanisms. For example, a user may place his cursor on a specific node of a generalized graph structure displayed on a computer monitor using his cursor control device and then select the node by pressing a button on the mouse 105. Alternatively, the root node may be claimed by implication from its node name. For example, in a web site, the web home page may have a URL (universal resource locator) which has a semantic structure which indicates that it must be the root node. For example, Xerox Corporation's home web page located at URL www.xerox.com may be parsed by a program implementing the methods according to the present invention, and this program may recognize that this web page is the root node of the web site to which the program is being applied by virtue of the name of the node. In any case, once a root node is specified at step 901, the current depth is set to zero at step 902. Step 902 merely specifies that the depth of the root node is, by definition, zero. This definition was illustrated in the tree structure 400 in FIG. 4 relative to the root node 201 at depth zero. At step 903, the method visits the claimed node having the highest usage parameter associated with it, which is at the current depth and which has not yet already been visited. When this step 903 is encountered for the first time during an execution of the method 900, the only node which will have been claimed is the root node, and the root node will also be the only node which exists at the current depth, and it will have not yet been visited. Therefore, the first time that step 903 is encountered in the method 900, the root node is visited.

At step 904, the method claims all children of the currently visited node, which have not already been claimed. The nodes which are claimed in step 904 can be easily identified by referring to the topology matrix and usage parameter vector. The children which should be claimed at step 904 are those nodes which have nonzero entries in the visited node's row of the topology matrix which have not already been claimed.

At step 905, the method 900 determines whether or not there are any additional claimed nodes at the current depth which have not yet been visited. The first time that step 905 is encountered in the method 900, the answer to the test presented in 905 will be no, because the only node at the current depth of zero is the root node itself Therefore, branch 952 takes the method to step 906 where the current depth is incremented. The first time that step 906 is encountered in the method 900, the current depth will be set to one.

At step 907, the method 900 determines if there are any nodes at the current depth (which was just increased). In other words, test 907 determines whether or not all nodes in the generalized graph structure have been both claimed and visited. If there are no nodes at the current depth, then all nodes have been claimed and visited and branch 954 takes the method to completion at step 908. However, assuming that there are nodes at the newly incremented current depth, branch 953 takes a method back to step 903. At step 903, the claimed node having the highest usage parameter at the current depth is visited. In other words, for all nodes which have been claimed that are at the current depth, the usage parameter is referenced from the usage parameter vector, and the claimed node having the highest usage parameter is selected first for visitation.

Steps 903, 904, and 905 are repeated for each claimed node in order of decreasing usage parameter associated with the claimed nodes at the current depth. The method 900 continues until all nodes have been claimed and visited, and then the method is done at step 908.

Figure 10:
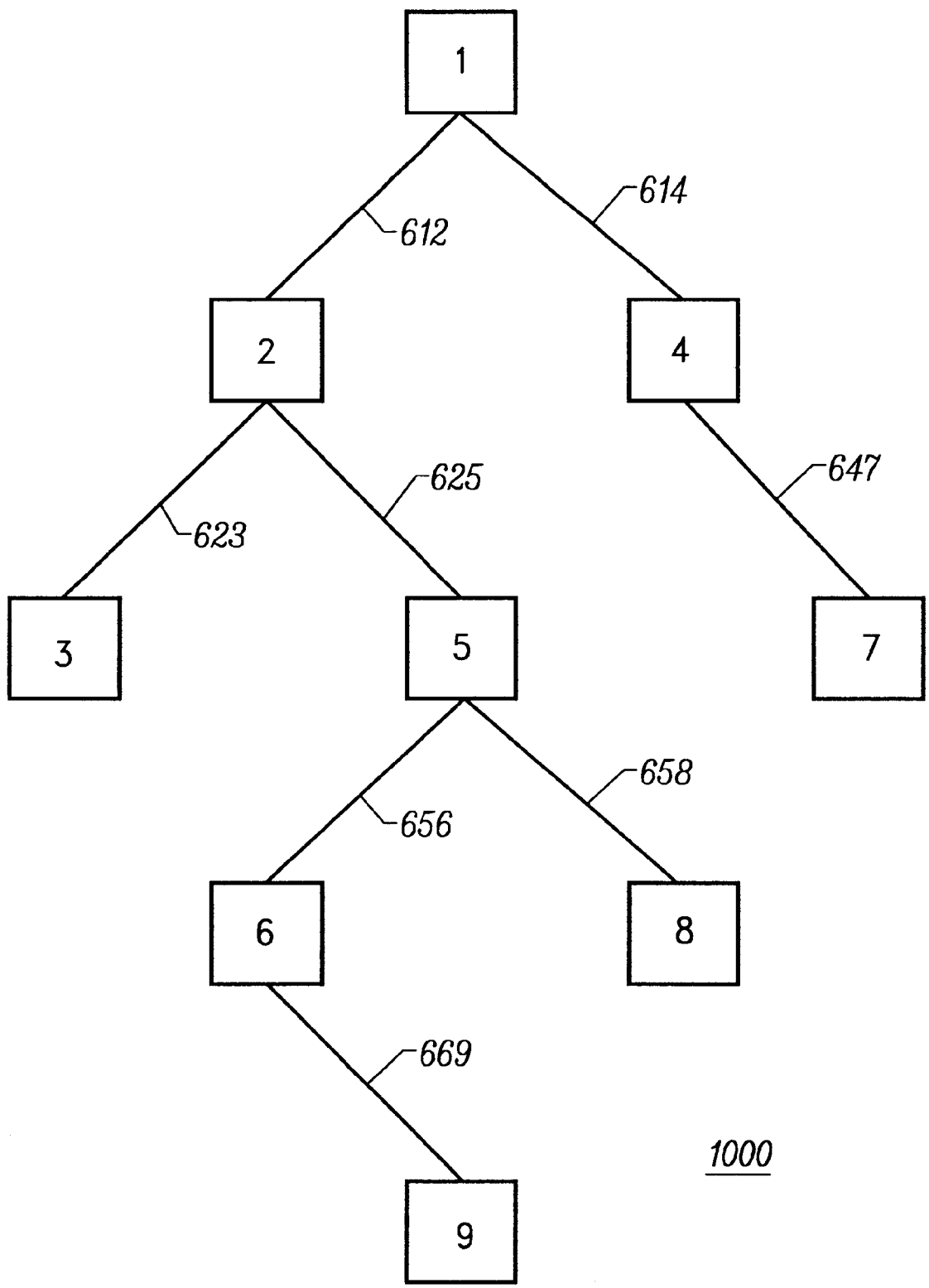
FIG. 10 illustrates a tree structure generated from the generalized graph structure shown in FIG. 6 by the breadth first method shown in FIG. 9 using the node usage parameter vector shown in FIG. 8.

FIG. 10 illustrates a tree structure generated from the generalized graph structure 600 shown in FIG. 6 by the breadth first method 900 shown in FIG. 9 and making reference to the usage parameter vector 800 shown in FIG. 8. In the tree structure 1000 shown in FIG. 10, the user specified node 1 as the root node and nodes 2 and 4 were claimed as the root node's children. After the depth had been incremented to 1, node 2 was visited prior to node 4 because node 2's usage parameter (found in entry 802 of the usage parameter vector) was larger than the usage parameter corresponding to node 4 found at entry 804 of the usage parameter vector 800. Specifically, node 2's usage parameter was 84 while node 4's usage parameter was 51, therefore node 2 was selected for visitation first, since 84 is greater than 51. When node 2 is visited, nodes 3 and 5 were claimed, as children of node 2. When node 4 was visited at depth equals one, it claimed node 7 as its child. Then all nodes at depth one had been visited, so the method 900 incremented the depth to two, and node 5 was selected for visitation prior to nodes 3 and 7 because node 5's usage parameter of 86 (found in entry 805 of the usage parameter vector 800) was greater than node 3's usage parameter of 6 and node 7's usage parameter of 44. When node 5 was visited, the method 900 claimed nodes 6 and 8 as node 5's children. Then node 7 was visited, but there were no children that could be claimed for node 7. Similarly, node 3 was visited at depth 2, but it could claim no children. So the depth was incremented to 3, and node 6, having usage parameter 96, was visited, and node 9 was claimed as the child of node 6. Node 8 at depth 3 and node 9 at depth 4 could not claim any children when they were visited. After claim 9 was visited, the current depth was incremented to five, but the method 900 determined at step 907 that no nodes existed at this depth, so branch 954 ended the method 900 at step 908.

Figure 11:
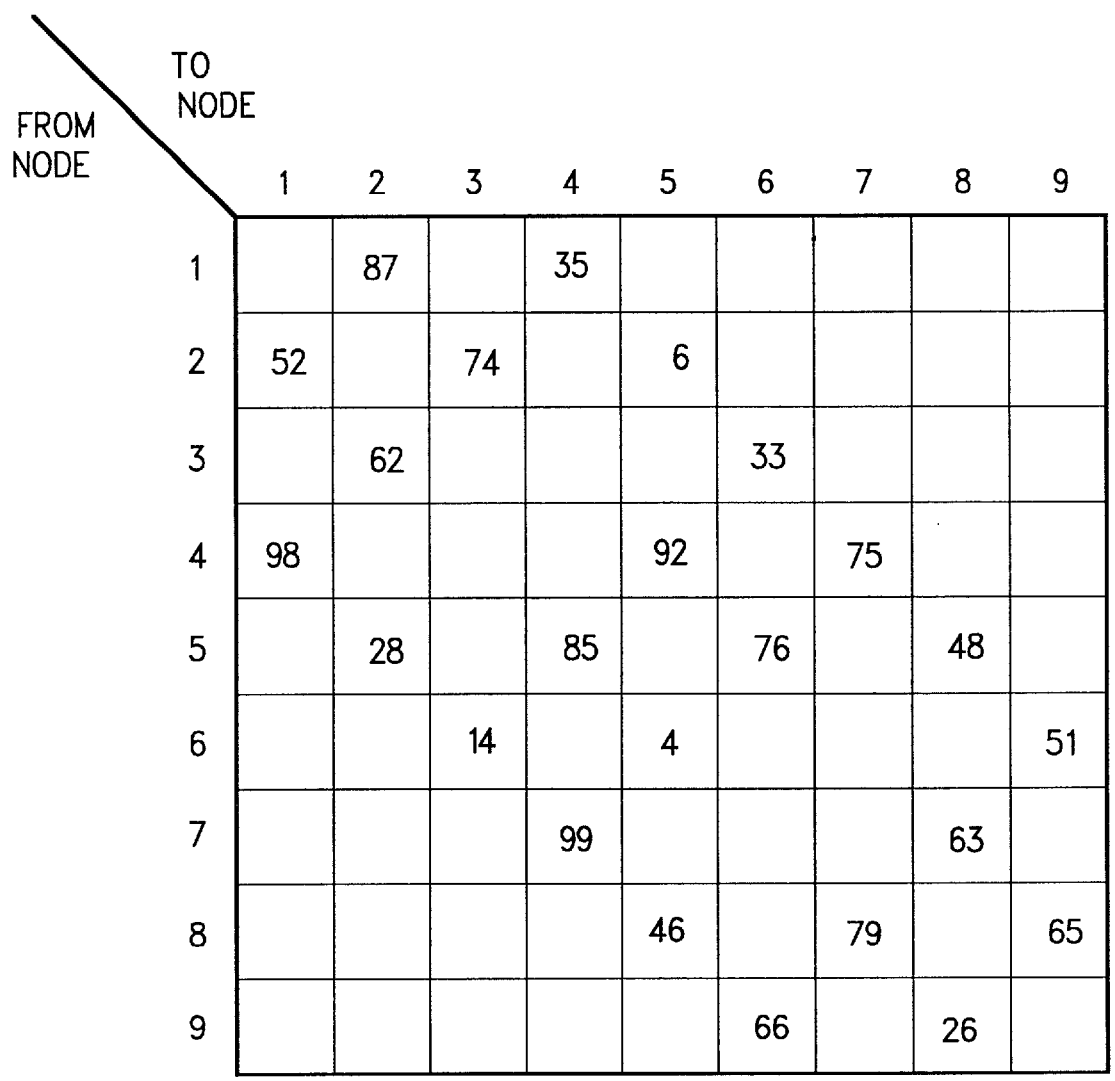
FIG. 11 a usage parameter matrix pertaining to the links of the generalized graph structure shown in FIG. 6.

FIG. 11 illustrates a usage parameter matrix 1100. The usage parameter matrix 1100 includes usage parameters pertaining to each of the links in the generalized graph structure 600 shown in FIG. 6. The usage parameters found in the usage parameter matrix 1100 specify the amount of measured usage of each of the links shown in the generalized graph structure 600 shown in FIG. 6. For example, the amount of usage of link 652, which provides a path from node 5 to node 2, is 28. In general, the usage parameter associated with the link from node i to node j is specified by the usage parameter found in row i, column j of the usage parameter matrix 1100. As another example of how the method 900 can be applied to a different measure of usage, the link usage parameters found in the usage parameter matrix 1100 can be referenced instead of the usage parameters found in the usage parameter vector 800 to determine the order of visitation at step 903. In other words, the usage parameter's associated with links pointing to the claimed children at a node may be referenced as the usage parameter determining the order of visitation of nodes at the same depth. If the link usage parameters shown in usage parameter matrix 1100 are modeling usage of hyperlinks in a nine page web site, then this example is concerned with the hyperlink usage rather than usage of any other individual web pages.

Figure 12:
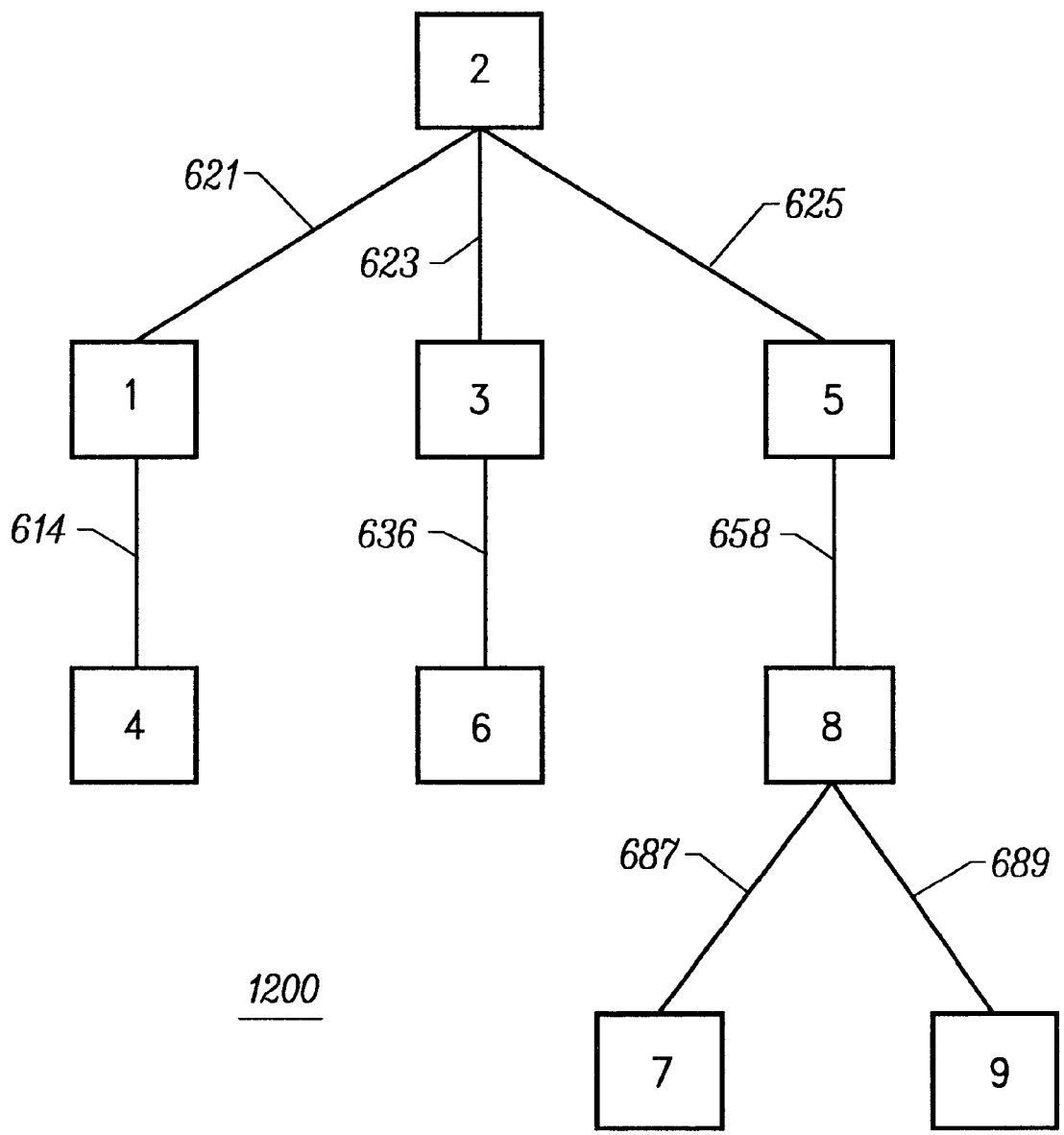
FIG. 12 illustrates a tree structure generated from the generalized graph structure shown in FIG. 6 by the breadth first method shown in FIG. 9 using the link usage parameter matrix shown in FIG. 11.

FIG. 12 illustrates a tree structure 1200 generated from the generalized graph structure 600 using the usage parameter matrix 1100 by the method 900 according to the present invention. In the tree structure 1200 shown in FIG. 12, the user has selected node 2 as the root node, nodes 1, 3, 5 were claimed as children of the root node 2, and node 3 at depth 1 was visited first because the usage parameter corresponding to links 623 from node 2 to node 3 has a usage parameter of 74, which is greater than the usage parameter of link 621 and the usage parameter of link 625. When node 3 was visited, it claimed node 6 as its child, and then node 1 was visited at depth 1. Node 1 claims node 4 as its child and then node 5 at depth 1 was visited. Node 5 claims node 8 as its child, and node 8 at depth 2 was visited first because the usage parameter associated with link 658 was greater than the usage parameter associated with link 636 and greater than the usage parameter associated with link 614. Thus, when node 8 was visited, it claimed node 7 and 9.

The methods according to the present invention may use any usage parameter to determine the ordering of visitation. For example, although node-based and link-based breadth first traversal algorithms have been disclosed, there is no requirement that the method according to the present invention use these specific usage parameters or this specific breadth first algorithm. For example, the usage parameter associated with each node could be a weighted linear function of the node usage parameter (such as shown in the usage parameter vector 800) and the link usage parameter (such as shown in the usage parameter matrix 700) to generate a derived usage parameter. Furthermore, the products of the link and node usage parameters could be computed and used as the usage parameter, which determines the node visitation order in step 903. As another example, the products of link usages from the root to a given node could be computed and used as the given node's usage parameters for determination of ordering of visitation at step 903. Moreover, the method 900 illustrated in FIG. 9 is only an example of a usage-based breadth first method that can be employed according to the present invention. Alternatively, the method 900 could be modified so that all sibling nodes of the currently visited node are visited prior to visiting cousin nodes or distantly related nodes that are at the same depth.

Figure 13:
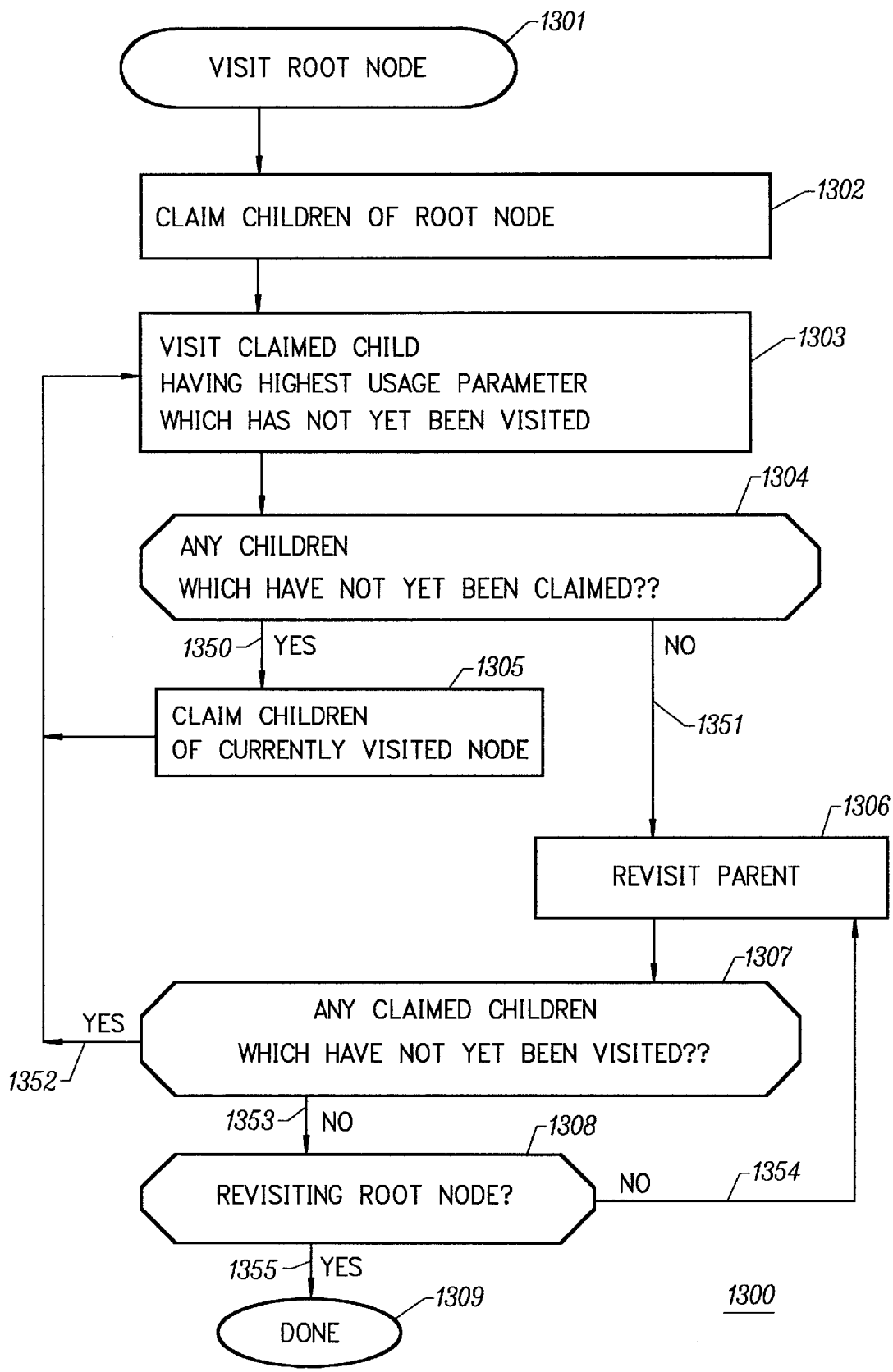
FIG. 13 illustrates a depth first method for generating a tree structure from a generalized graph structure according to the present invention.

FIG. 13 illustrates a usage-based depth first method of generating a tree structure from a generalized graph structure according to the present invention. After a root node has been identified, at step 1301 the root node is visited, and the children of the root node are claimed at 1302. At step 1303, the method visits the claimed child having the highest usage parameter which has not yet been visited. At step 1304, the method determines whether or not the currently visited node has any children which have not yet been claimed. If unclaimed children exist, branch 1350 claims those children and then step 1303 visits the claimed child having the usage parameter which has not yet been visited. In other words, steps 1303, 1304, and 1305 are performed until the end of a lineage of children has been reached. When a node is reached that has no children which have not yet been claimed, branch 1351 takes the method 1300 to step 1306, where the parent of the currently visited node is revisited. At step 1307, the method 1300 determines whether or not the currently visited node has any claimed children which have not yet been visited. If claimed children exist which have not yet been visited, branch 1352 takes a method back to step 1303. However, if there are no claimed children which have not yet been visited, then branch 1353 takes a method 1300 to step 1308. At step 1308, the method 1300 checks to see whether or not the root node is being revisited. If the method 1300 is not revisiting the root node, then branch 1354 takes a method 1300 back to step 1306 where the parent of the currently visited node is revisited. If step 1308 determines that the method 1300 is revisiting the root node, branch 1355 takes the method 1300 to completion at step 1309.

Essentially, the usage-based depth first method 1300 according to the present invention visits as many nodes in a linked lineage as it can until it reaches a leaf node. When the method 1300 reaches a leaf node, step 1306 sends the method 1300 back to the leaf node's parent, so that other children of the leaf node's parent can be visited. Essentially, any visited node's entire descendent sub tree will be claimed and visited before any of its siblings are visited.

Figure 14:
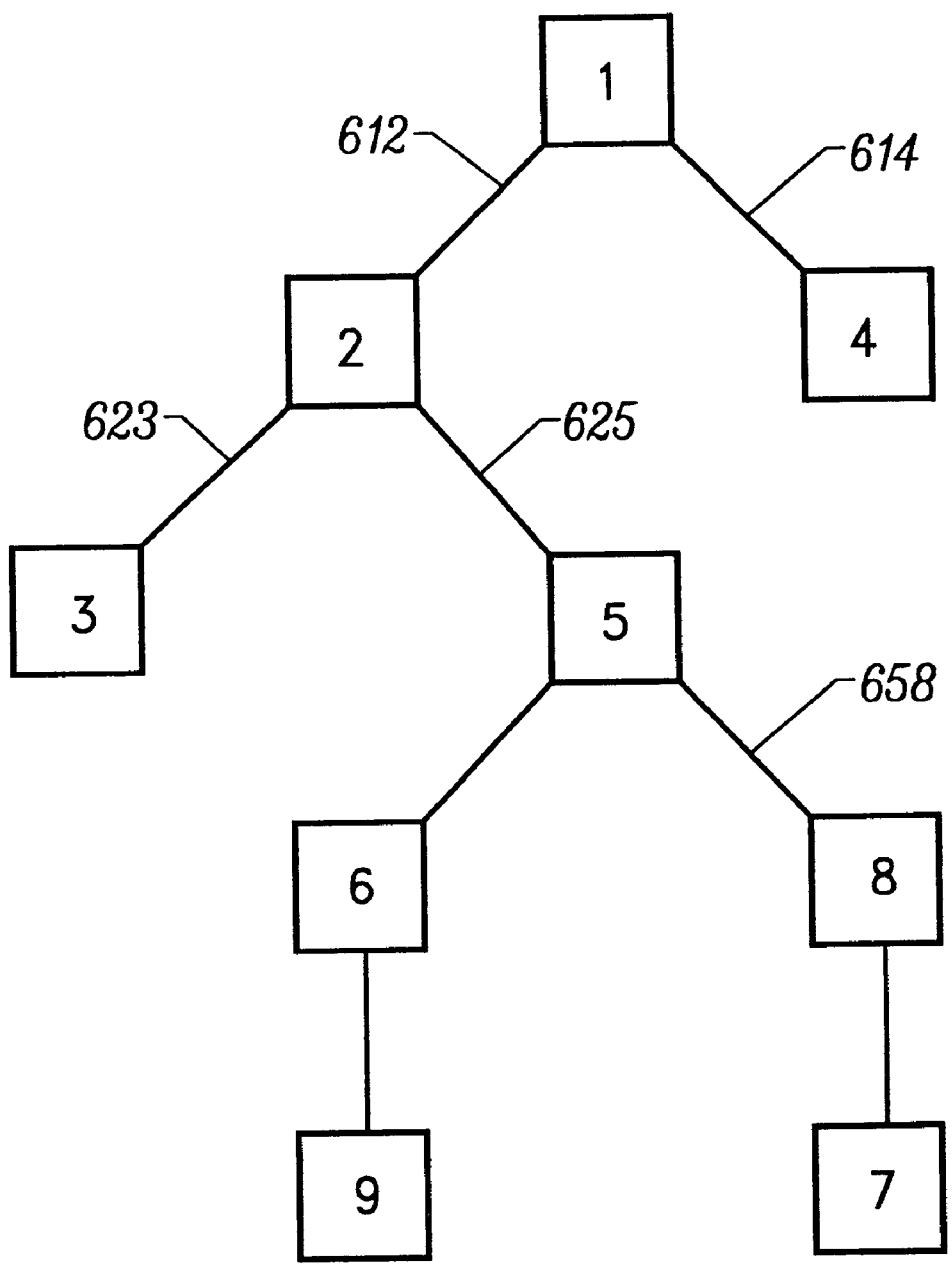
FIG. 14 illustrates a tree structure generated from the generalized graph structure shown in FIG. 6 by the depth first method shown in FIG. 13 using the node usage parameter vector shown in FIG. 8.

FIG. 14 illustrates a tree structure 1400 generated from the generalized tree structure 600 using the usage parameter vector 800 shown in FIG. 8 by the depth first method 1300 according to the present invention. Node 1 is the root node of the tree structure 1400. Nodes 2 and 4 are claimed as children of node 1, and node 2 is visited before node 4 because node 2's usage parameter is higher than node 4's usage parameter. When node 2 is visited, nodes 3 and 5 are claimed as its children. Then node 5 is visited because node 5's usage parameter is higher than node 3's usage parameter. When node 5 is visited, node 6 and 8 are claimed as its children. Then, node 6 is visited because node 6's usage parameter is higher than node 8's usage parameter. When node 6 is visited, node 9 is claimed as its child, and then node 9 is visited. When node 9 is visited, step 1304 determines that there are no children which can be claimed by node 9, so step 1306 dictates that node 6 is revisited, and step 1307 determines that there are no more claimed children of node 6 which have not yet been visited. So then branch 1353 takes the method to step 1308 which determines that node 6 is not the root node. So then branch 1354 takes a method back to step 1306 where node 6's parent is revisited. At this point in the method 1300, node 5 is being revisited. Step 1307 determines that there is a claimed child of node 5 which has not yet been visited, namely node 8. Thus, branch 1352 takes method 1300 back to step 1303 where node 8 is visited. When node 8 is visited, node 7 is claimed as its child. When node 7 is visited, step 1304 determines that there are no children which node 7 can claim, so step 1306 dictates that node 8 be revisited. Then after going through steps 1307 and 1308, step 1306 again takes the method back to node 5, and another loop through steps 1307 and 1308 takes the method back to node 2. Then node 3 is visited, node 2 is then revisited, and then the root node 1 is revisited. After step 1306 has dictated that the root node 1 be revisited, step 1307 determines that there is a claimed child of the root node 1, which has not yet been visited, namely node 4. Thus, branch 1352 take the method back to step 1303 and node 4 is visited. However, step 1304 determines that there are no children which node 4 can claim, therefore branch 1351 takes a method back to step 1306, so that the root node is again revisited. This time, step 1307 determines that all claimed children of the root node have been visited, so branch 1353 takes a method to step 1308, which determines that the method 1300 is revisiting the root node and then branch 1355 takes the method to completion as step 1309.

The various variations of usage parameters used for determining the order of visitation of children nodes in the depth first method 1300 according to the present invention are available as discussed above relative to the usage-based breadth first method 900. Specifically, link usage, node usage, linear or non-linear functions of link and node usage, path usage, as represented by functions of each link from the root to a give node, and a variety of other usage parameters may be employed using the method 1300 illustrated in FIG. 13. Moreover, slight variations of the usage-based depth first method 1300 may be implemented according to the present invention.

Figure 15:
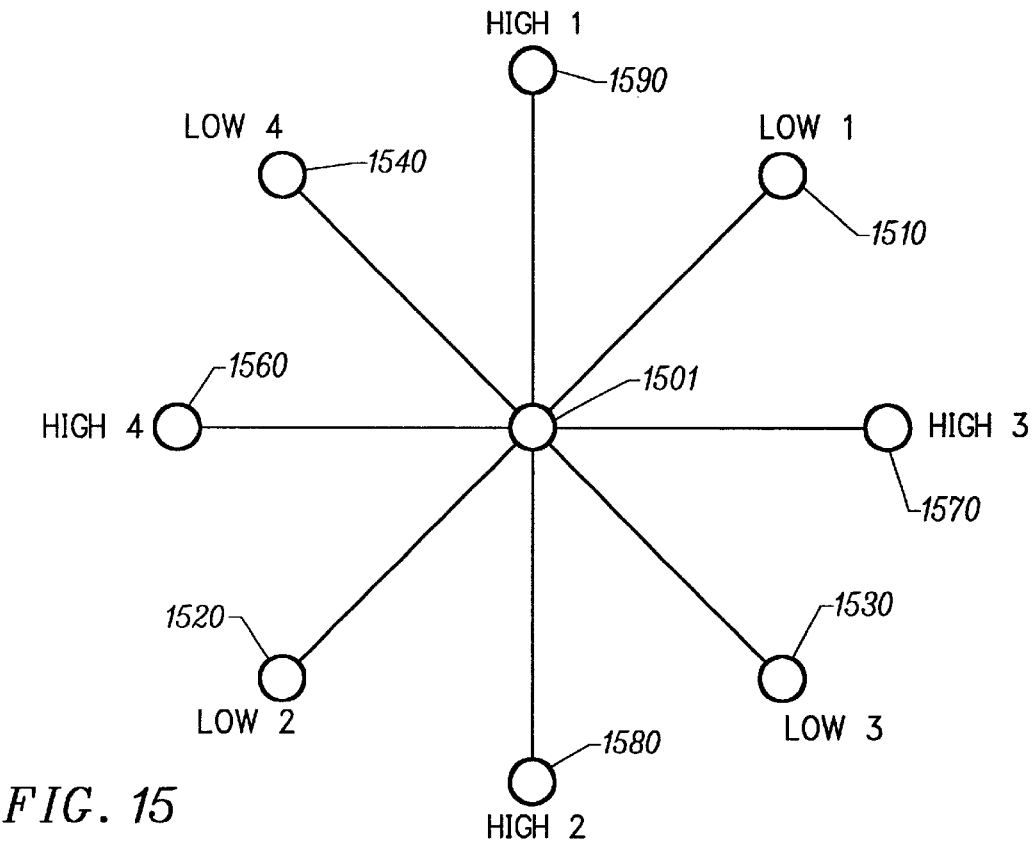
FIG. 15 illustrates node placement according to the present invention for display of sibling nodes relative to their parent at layout angles such that highest ranking sibling nodes ranked by their usage parameters are optimally separated.

FIG. 15 illustrates a manner of laying out a display of a tree structure radially about a parent node 1501. Nodes 1510, 1520, 1530, 1540, 1560, 1570, 1580, and 1590 are children of parent node 1501. For convenience, the reference numerals have been assigned such that they are monotonically related to the usage parameter of the sibling nodes. For example, node 1590 has a higher usage parameter than node 1580. The lowest usage node is node 1510. In FIG. 15, the highest used nodes are separated optimally from each other, at the expense of lesser used nodes. Thus, node 1590 (the highest usage node) is placed 180° away from node 1580 (the second highest used node). After the four highest used nodes 1590, 1580, 1570 and 1560 are placed so as to form four 90° angles, the lowest used node is placed so as to bisect the angle formed by the two adjacent nodes having the highest total usage.

At this point, it is useful to consider the rankings of sibling nodes when sorted by their usage parameters. Node 1590 ranks 1 and node 1510 ranks 8. Once the highest used half of the siblings have been laid out, the lowest used half of the siblings can be laid out such that the lowest used node is placed so as to bisect the angle formed by the two adjacent siblings which have the lowest sum of their rankings. For example, node 1590 (which ranks one) and node 1570 (which ranks three) have a sum of rankings which equals four, and that ranking is the lowest ranking (indicating highest usage) of any of the right angles formed by the four highest usage nodes. Thus, the lowest used node 1510 is placed so as to bisect nodes 1590 and 1570. The next lowest usage node, namely node 1520 is placed opposite the lowest used node, and the remaining members of the lowest used half of the nodes are laid out similarly so as to bisect angles formed by nodes which are among the highest usage half of the sibling nodes. There are a variety of ways according to the present invention that this usage-based display can be accomplished. For example, each sibling may be allocated a constant amount of angular space based upon the total number of siblings, and then the highest used half of the siblings may be plotted to achieve optimal separation from each other based upon usage, and then the lowest used half of the siblings may be laid out so as to bisect the angles formed by the highest half of the nodes as described above. In the alternative, the highest usage nodes can always be placed 180° from each other and angular space between already laid out adjacent nodes can be divided by two each time a new node is laid out, even if the number of siblings is not an exact power of two.

Figure 16:
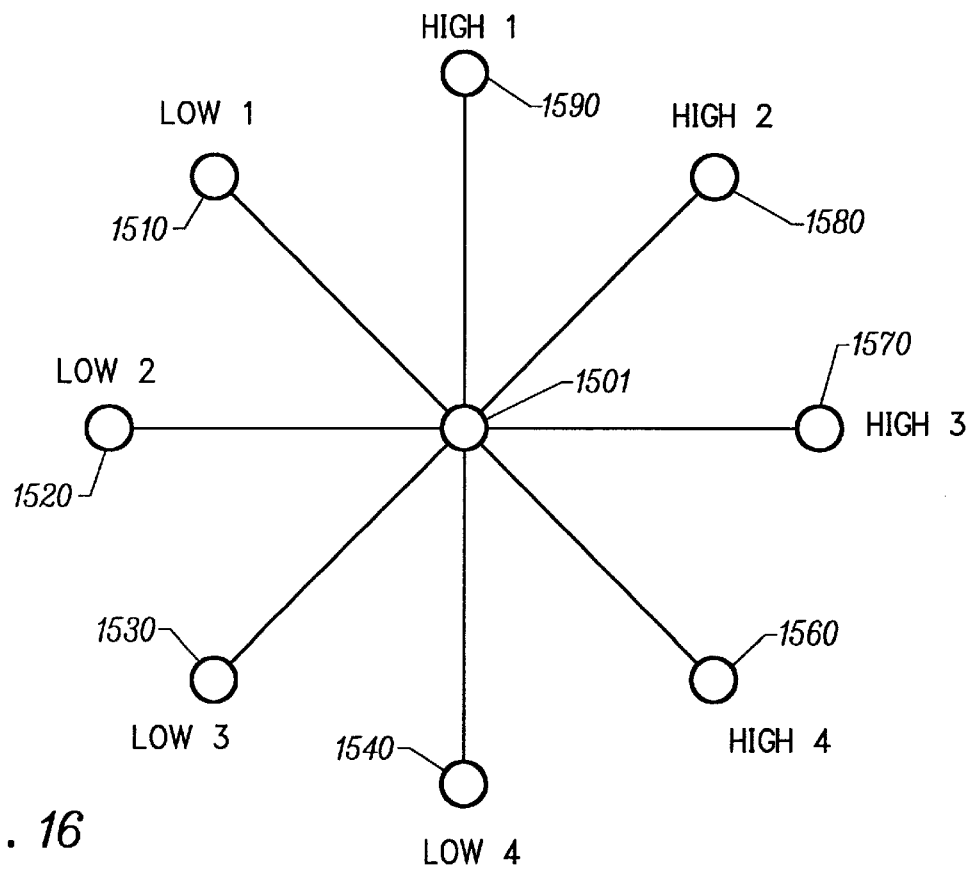
FIG. 16 illustrates node placement according to the present invention for display of sibling nodes relative to their parent at layout angles that increase monotonically with the ranking of the sibling nodes ranked by their usage parameters.

FIG. 16 illustrates another method according to the present invention of displaying a group of sibling nodes using their usage parameters to determines their placement about their parent node 1501. In this method, a certain angle is specified as the angle at which the highest usage node will be placed. The 360° of the circle is divided by the total number of sibling nodes. The highest usage node is placed as the specified angle designated for, and then the remaining nodes are placed so as to be adjacent to the next highest usage node relative to them. Thus, the highest usage node is placed at the specified angle, and the second highest usage node is placed adjacent to the highest usage node, the third highest usage node is placed adjacent to the second highest usage node, and so forth, until the lowest usage node is laid out. Thus, the angular placement of each node is monotonically related to its layout angle relative to its parent.

Figure 17:
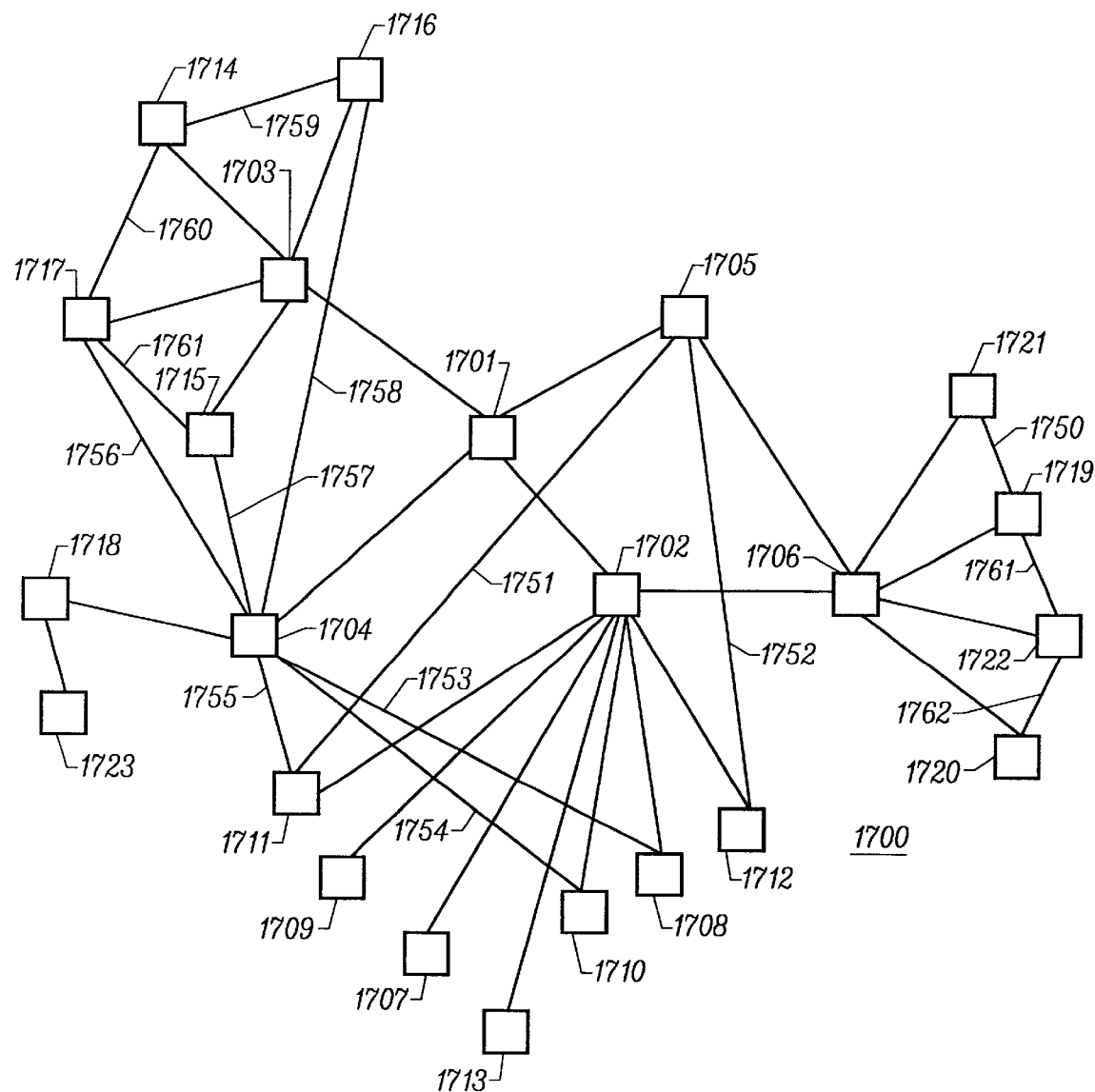
FIG. 17 illustrates another generalized graph structure.

FIG. 17 illustrates a generalized graph structure 1700 consisting of twenty-three nodes, 1701 through 1723. By picking node 1701 as the root and performing a breadth first traversal of the generalized tree structure 1700, links 1750 through 1762 are eliminated so as to eliminate cycles and thereby create a tree structure.

Figure 18:
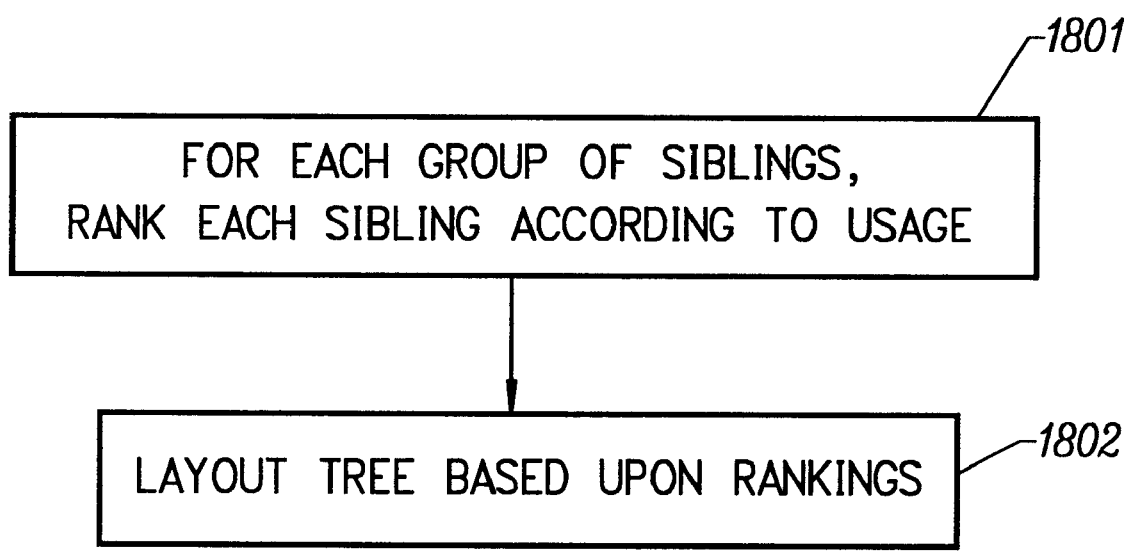
FIG. 18 illustrates a method of displaying a tree structure based upon usage according to the present invention.

FIG. 18 illustrates a method of displaying a tree structure using usage rankings according to the present invention. At step 1801, for each group of siblings in the tree structure, each sibling is ranked according to its usage parameter. At step 1802, the tree structure is laid out based upon the rankings of all the sibling groups within the tree structure.

Figure 19:
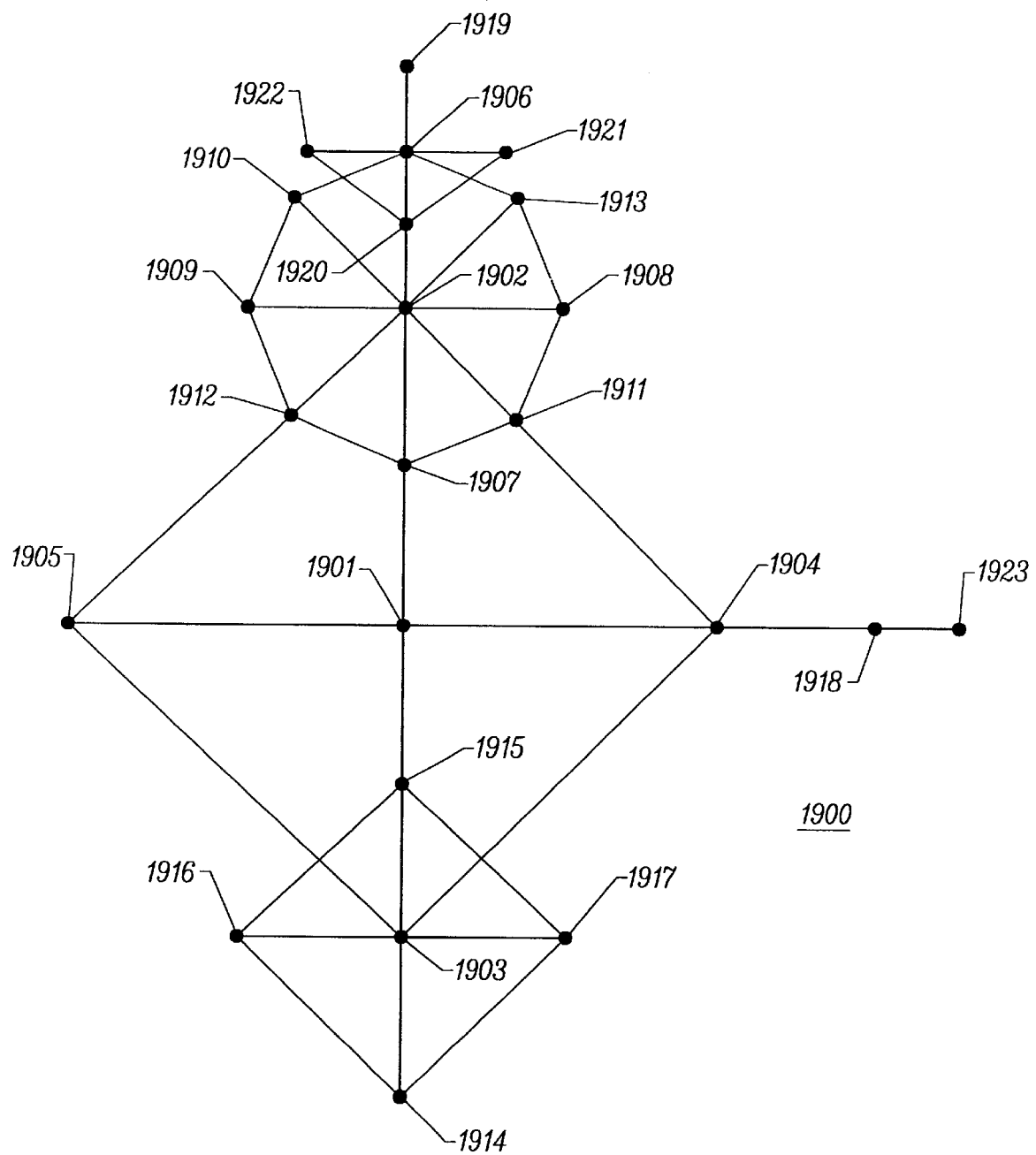
FIG. 19 illustrates a squashed cone tree representation of the generalized graph structure shown in FIG. 17 displayed by a method according to the present invention.

FIG. 19 is a squashed cone tree display of the tree structure derived from the generalized graph structure 1700 shown in FIG. 17. The points representing nodes of the generalized graph structure 1700 are labeled with reference numerals which are correspondent to the reference numerals of the nodes shown in FIG. 17. For example, node 1723 is displayed as point 1923 in the display 1900. Thus, by adding 200 to the reference numeral shown in FIG. 17, the point representing that referenced node is obtained. In FIG. 17, the usage parameters associated with the various nodes are inversely related to the reference numeral. For example, amongst a group of sibling nodes 1702 through 1705, node 1702 has the highest usage, and node 1705 has the lowest usage. Therefore, the reference numeral can be viewed as the ranking of the usage parameter relative to its siblings. In FIG. 19, the root node 1901 is placed in the center, and its children nodes 1902, 1903, 1904, and 1905 are laid out according to the optimal separation procedure described above relative to FIG. 15. Similarly, the eight children of node 1902, which are nodes 1906 through 1913, are laid out radially from their center parent 1902 in the manner described above relative to FIG. 15. Similarly, the children of node 1906, namely nodes 1919 through 1922, are laid out so as to achieve optimal separation in the manner described above relative to FIG. 15. The children of node 1903, namely 1914 through 1917, are positioned such that the highest ranking and highest usage node 1914 is placed as far away from the center 1901 as possible, and its siblings are placed as described above. The child node 1904 is placed as far away as possible from the center 1901 at point 1918. The child of point 1918 (node 1923) is placed as far away as possible from node 1904. In general, the highest usage node of any group of siblings is preferably place at an angle farthest away from its grandparent node, although there is no requirement according to the present invention that this be the case. Sibling nodes may be connected to their adjacent siblings via translucent lines to further clarify their sibling relationships. The optional translucent lines are illustrated in FIG. 19, but are not labeled with reference numerals.

In FIG. 19, all siblings are placed a constant radius from their common parent. In the example illustrated in FIG. 19, this radius decreases by a factor of two for each increase of depth that a node incurs in the tree structure. However, there is no requirement that the radii of siblings from their parent be related to depth in this manner. In the display 1900 shown in FIG. 19, the layout angle for each child node is measured from its parent.

Figure 20:
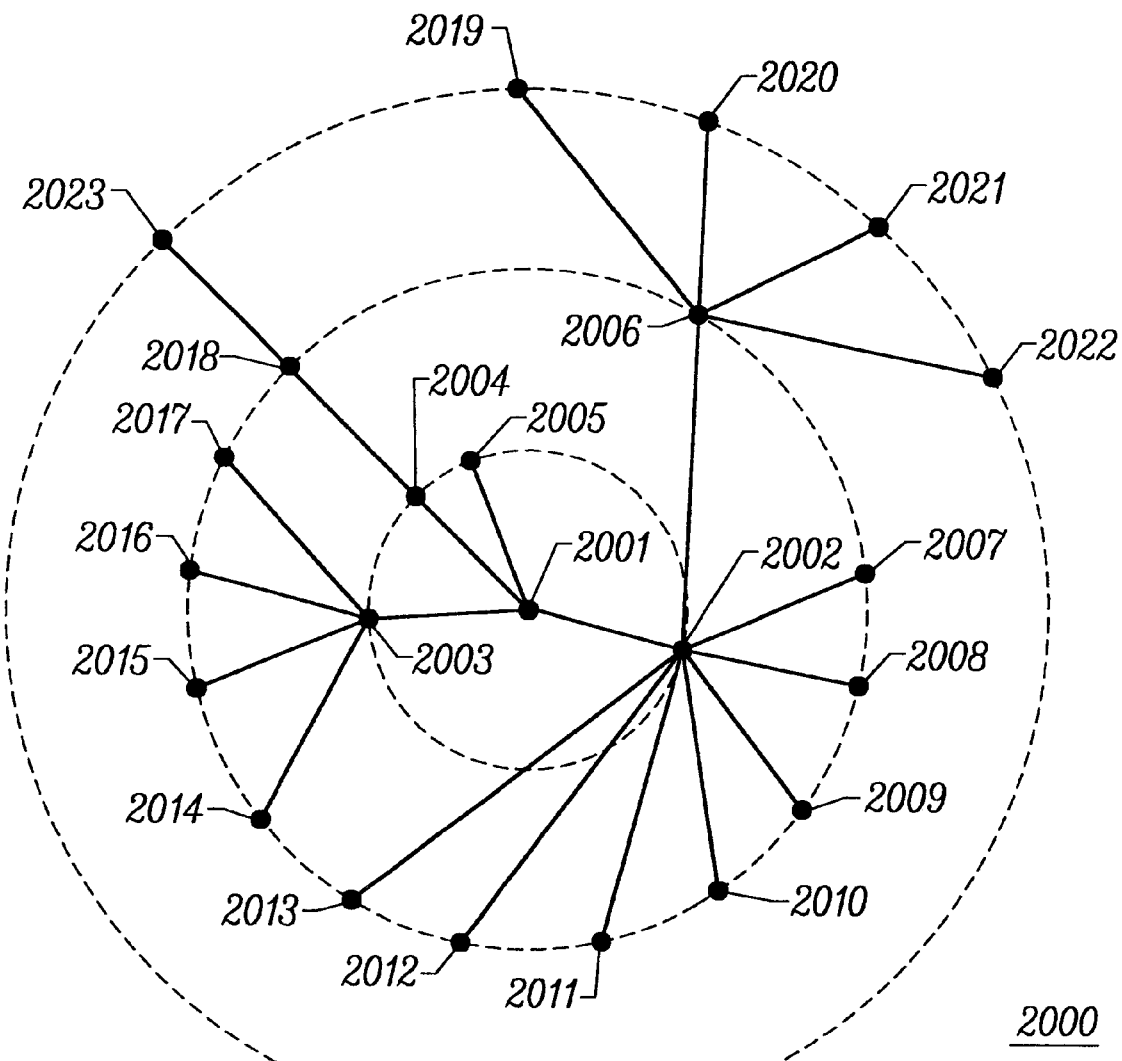
FIG. 20 illustrates a disk tree representation of the generalized graph structure shown in FIG. 17 displayed by a method according to the present invention.

FIG. 20 illustrates a disk tree display of the tree structure generated from the generalized graph structure 1700 shown in FIG. 17. In FIG. 20, highest usage nodes are placed at angles closest to the vertical. For example, node 2002 is the highest usage node at depth 1, node 2003 is the next highest usage node at depth 1, and node 2005 is the least used node of depth 1. Thus, starting at vertical and continuing around each depth circle in a clockwise direction, the user can see the nodes at that depth in order of their usage, seeing the most used nodes first. From among siblings 2006 through 2013, node 2006 is the highest usage and node 2013 is the lowest usage. As described above with reference to FIG. 5, each leaf node is assigned a constant amount of angular space in the layout of FIG. 20. The layout of FIG. 20 measures the layout angle for each child node from the center of the layout of the tree structure. Therefore, the layout angle of each node is measured as the angle formed by a ray extending from the center 2001 to the node and a ray extending from the center 2001 to the vertical (which passes through point 2019 in FIG. 19).

Although the squashed cone tree depiction 1900 uses the optimal separation layout technique described with reference to FIG. 15, and although the disk tree representation 2000 is laid out using the monotonic relationship between ranking and layout angle, there is no requirement according to the present invention that this relationship between sibling placement and type of display algorithm occur. For example, although it is not illustrated, a squashed cone tree representation can have sibling placements determined by the method described relative to FIG. 16 in which monotonic relationships between layout angles and sibling nodes exist. Similarly, a disk tree representation may employ the optimal separation sibling layout procedure such as described with respect to FIG. 15.

Time tubes according to the present invention are a type of visualization that enables the identification of interesting changes and quick access to data across a wide range of transformations. Time tubes exist in a three dimensional work space and are created by stacking and aligning two-dimensional circular slice (such as disk trees) into a cylindrical representation, similar to a log. Each disk tree is a visual representation of the data during a stage of the transformation (such as clustering or temporal). The resulting visualization allows the user to see how data were transformed from one point to another. This higher level representation permits the user to perform a set of operations (such as rotation, picking, and brushing) and navigation techniques (such as changing point of view or zooming) to understand complex transformations of large data sets as well as identify and isolate areas of interest within data sets. Time tubes also provide the framework to instantiate novel visualizations, layout algorithms, and interactions.

Time tubes according to the present invention address the problem of how to show the changes over time of the structure and usage of a large document collection. A two-dimensional circular tree (or other layout) is computed at multiple points in time. All nodes that ever exist are used to lay out the tree. Nodes and links may be colored to indicate addition, deletion, and usage. There are several variations according to the present invention. The present invention may be used to interpret internet events, such as the change in usage of the Xerox site after the filing of Xerox's 10-K.

Using disk trees, the third dimension is used to represent time. In the time tube visualization, multiple disk trees are laid out along a spatial axis. By using a spatial axis to represent time, the viewer sees the information space-time in a single visualization, thus facilitating easy sense-making on the entire information space-time space. Because conventional display monitors 104 are two dimensional display devices, a three dimensional display structure must be projected onto the two dimensional display 104. The third dimension is thus projected onto the first two. However, this projection does not negate the power of the three dimensional structure. Most readers can readily attest that although movies are projected onto a two dimensional screen, the three dimensional content being displayed is readily understood and appreciated.

Slices in the information space-time of time tubes according to the present invention are actually not laid out parallel to each other. Each slice is rotated so that it occupies the same amount of screen area as other slices. Because of perspective effects, if each slice were parallel to each other, then slices in the center would occupy smaller amounts of space than slices on the side. Also, the viewer would see the front side of the slices that are on the left side of the viewing frustum, and the backside of the slices that are on the right side of the viewing frustum. By carefully monitoring the viewing degree of interest, the system can also emphasize certain slices, and de-emphasize others to get a focus+ context effect. This mapping of multiple variables is mitigated if the disk trees are turned toward the viewer. By making the disk trees two dimensional in a three dimensional world, additional flexibility in the mapping is gained at the cost of perspective distortions and lower readability.

Instead of having a different layout for each disk tree, a combined layout is generated for all trees. All of the documents that ever existed in the entire time range of the time tube are taken into account to produce a slice template by computing a single disk tree layout that is then used across all of the disk tree slices. This produces a layout that remains consistent across disk trees.

Another interesting variant of the time tube is obtained by stacking the disk trees in the time tube and then flying through the tube, or similarly, to play the disk trees one after another in time order so as to create an animation of change. That is, instead of mapping time into space, time is simply mapped into time. This method is more compact, hence the disk trees can be larger, and it engages the motion detection capabilities of the human perceptual system. The detection of change and the interpretations of series of changes are enhanced at the cost of the ability to do comparisons between different points in time.

A time tube according to the present invention consists of a series of individual two-dimensional visualizations (slices) aligned within a cylinder. Transformations (such as the addition of new entities, the changing of values of existing entities, and the distortion of physical size) applied to a series of data as is transforms from one state to another are visualized. A time tube may undergo one or more transformations from one state to another state. The transformations use the length of the cylindrical tube, filling the length of the tube with two-dimensional representations of the data, or slices, at various stages of the transformations. Time tubes can encode several dimensions of the transformations at once by altering the representations of size, color, and layout. The transformations that time tubes can visualize include, but are not limited to: (1) temporal (with respect to the Web site analysis tool, web pages are added, changed, and deleted over the course of a period of time); (2) value-based (with respect to the Web site analysis Tool, since frequency is encoded by color, when a page's visitation rate changes, so does its corresponding color), and (3) spatial (although the web site analysis tool does not utilize this ability, entities can shrink and expand).

The process of how data is clustered and which elements end up in which cluster may be illustrated according to the present invention. The ability to perform both tasks visually at the same time is quite useful. Moreover, size, color, and layout can redundantly encode various aspects of a clustering, making it easier to identify trends and patterns within the data. Several operations are afforded by time tubes according to the present invention.

Since a time tube is a cylindrical log, it can be rotated along its axis to move data closer to the user's viewpoint. The user is also able to select one entity and have the corresponding entities highlighted in each slice (a technique called brushing). If a user finds one slice particularly interesting, he can grab it and drag the slice out of the time tube for further inspection. The slices can also be rotated to provide the user with a face-on perspective of each slice. Given that Time Tubes exist in a three dimensional work space, the user can fly around the time tube, zooming in and out of areas of interest.

Figure 21:
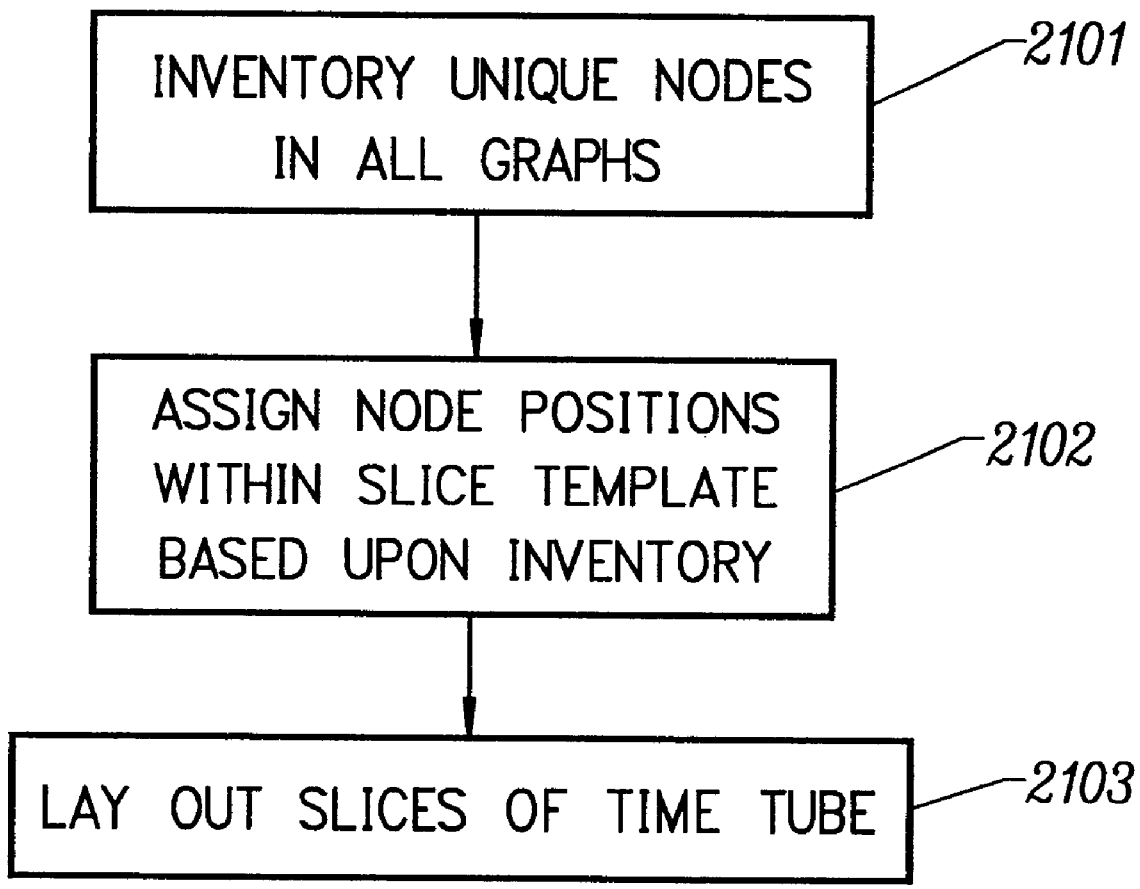
FIG. 21 illustrates a method of displaying a related series of graphs in a time tube according to the present invention.

FIG. 21 illustrates a method for displaying a related series of graphs according to the present invention. At step 2101, an inventory of all unique nodes in all graphs is performed, thereby creating a list of all nodes which have existed in any of the related series of graphs. At step 2102, node positions within a slice template are assigned based upon the inventory generated in step 2101. In step 2103, the planar slices of a time tube are laid out by placing each node existing in each of the related series of graphs into the planar slice corresponding to the graphs in which each node is found.

Figure 22:
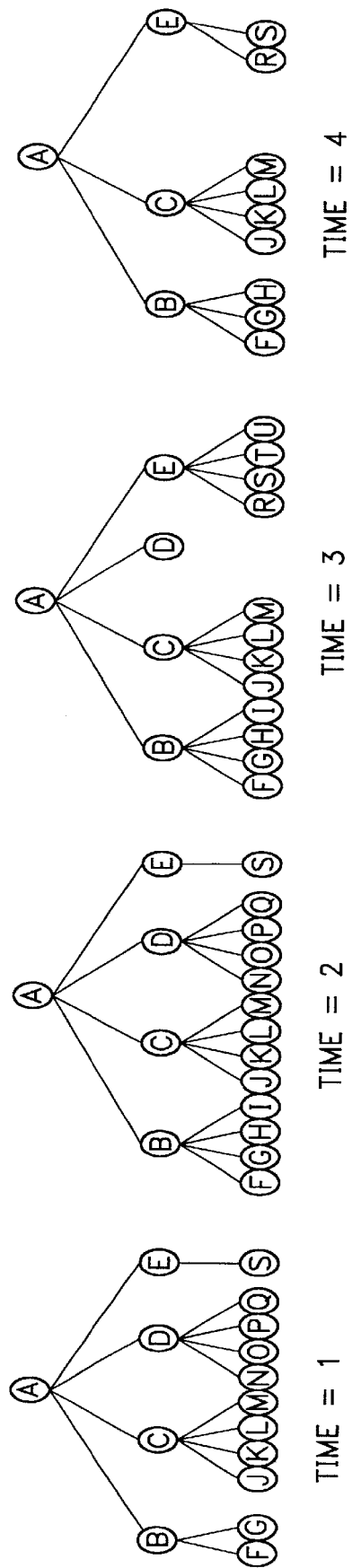
FIG. 22 illustrates a related series of graphs suitable for display as a series of planar slices in a time tube according to the present invention.

FIG. 22 shows a series of related graphs suitable for display by method 2100 according to the present invention. FIG. 22 shows four separate graphs which are related. Specifically, the graphs share common nodes. The four graphs may be viewed as evolution of a web site occurring over a time period. The structure of the graph shown corresponding to time 1 may be viewed as the beginning structure of a web site. At time 2, nodes H and I are added as children to node B. At time 3, nodes N, O, P, and Q, which had been children of node D, are deleted. At time 4, nodes I, D, T, and U are deleted. Thus, as can be clearly observed, many nodes remain throughout all times 1 through 4, while other nodes exist only during certain times.

Figure 23:
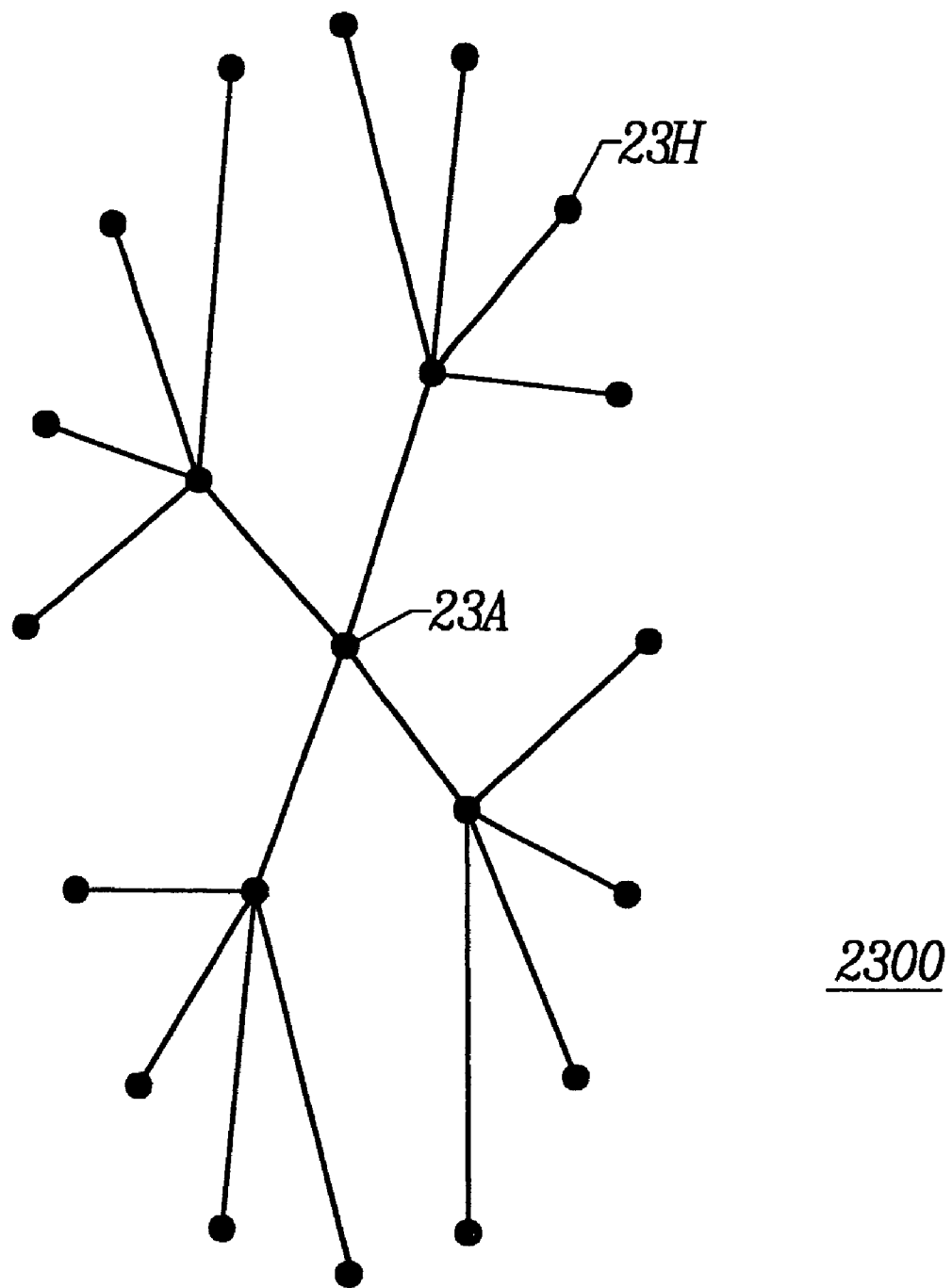
FIG. 23 illustrates a planar template for determining node placement within planar slices of a time tube representation of a related series of graphs according to the present invention.

FIG. 23 illustrates a planar template determining positions of nodes within planar slices which make up a time tube. The planar template 2300 is constructed by inventorying all nodes which have existed at any time. During the inventory performed in step 2101, the parent of each node must be recorded as well, so that a tree structure representing all nodes which have existed at any time. The points shown in the planar template 2300 correspond to the placement of each node within each of the planar slices, which make up the time tube according to the present invention. The central point 23A is the point for display of node A. The point 23H is the position for display of node H. By appending the node letter to 23, the reference numeral for the point in the planar template corresponding to each node can be readily derived.

Figure 24:
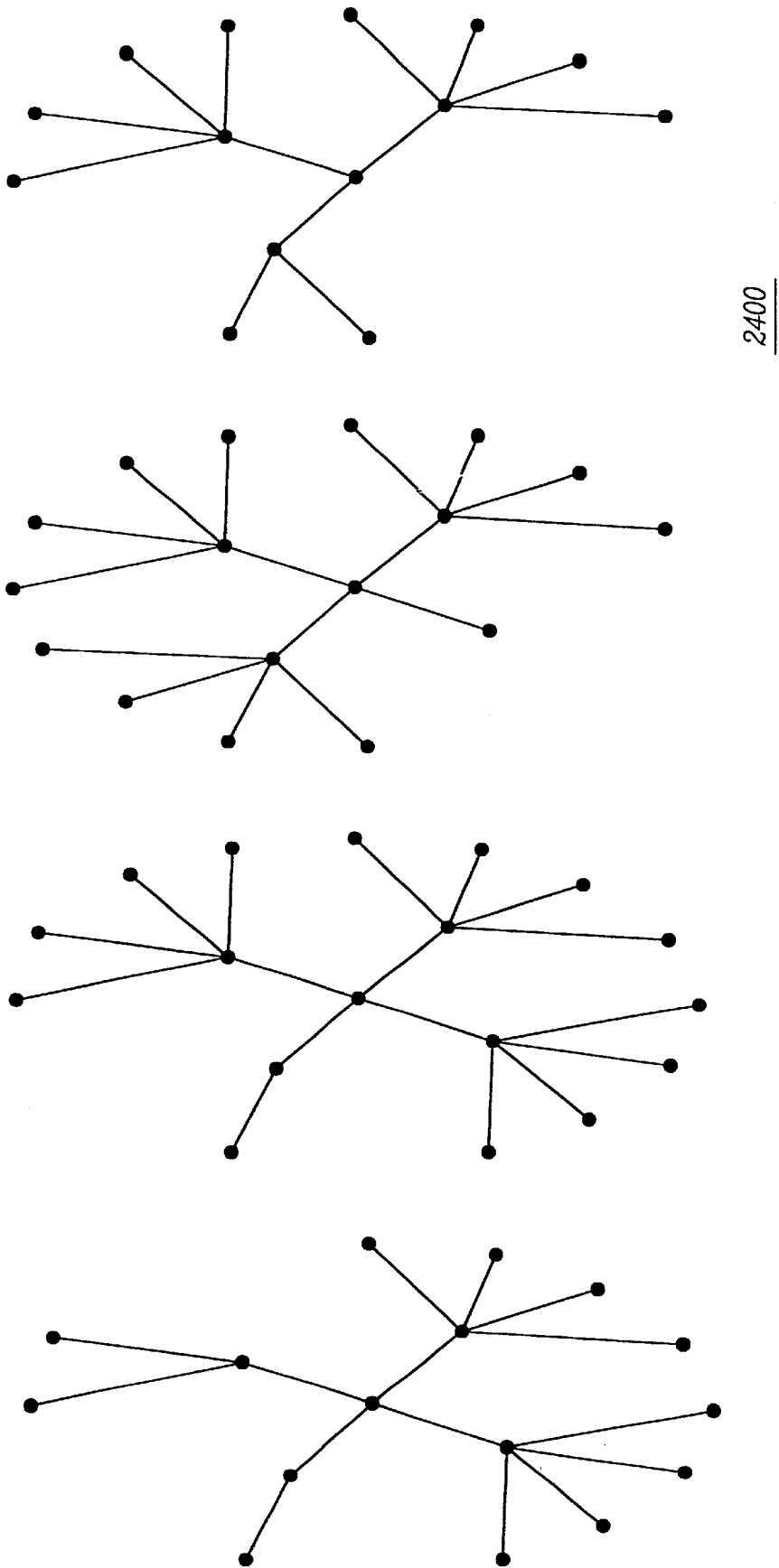
FIG. 24 illustrates a series of planar slices in a time tube representing a changing tree structure displayed by methods according to the present invention.

FIG. 24 illustrates a series of planar slices which constitute a time tube according to the present invention. The planar slices 2400 illustrated in FIG. 24 correspond to the related series of graphs shown in FIG. 22 and the planar template 2300 shown in FIG. 23.

Figure 25:
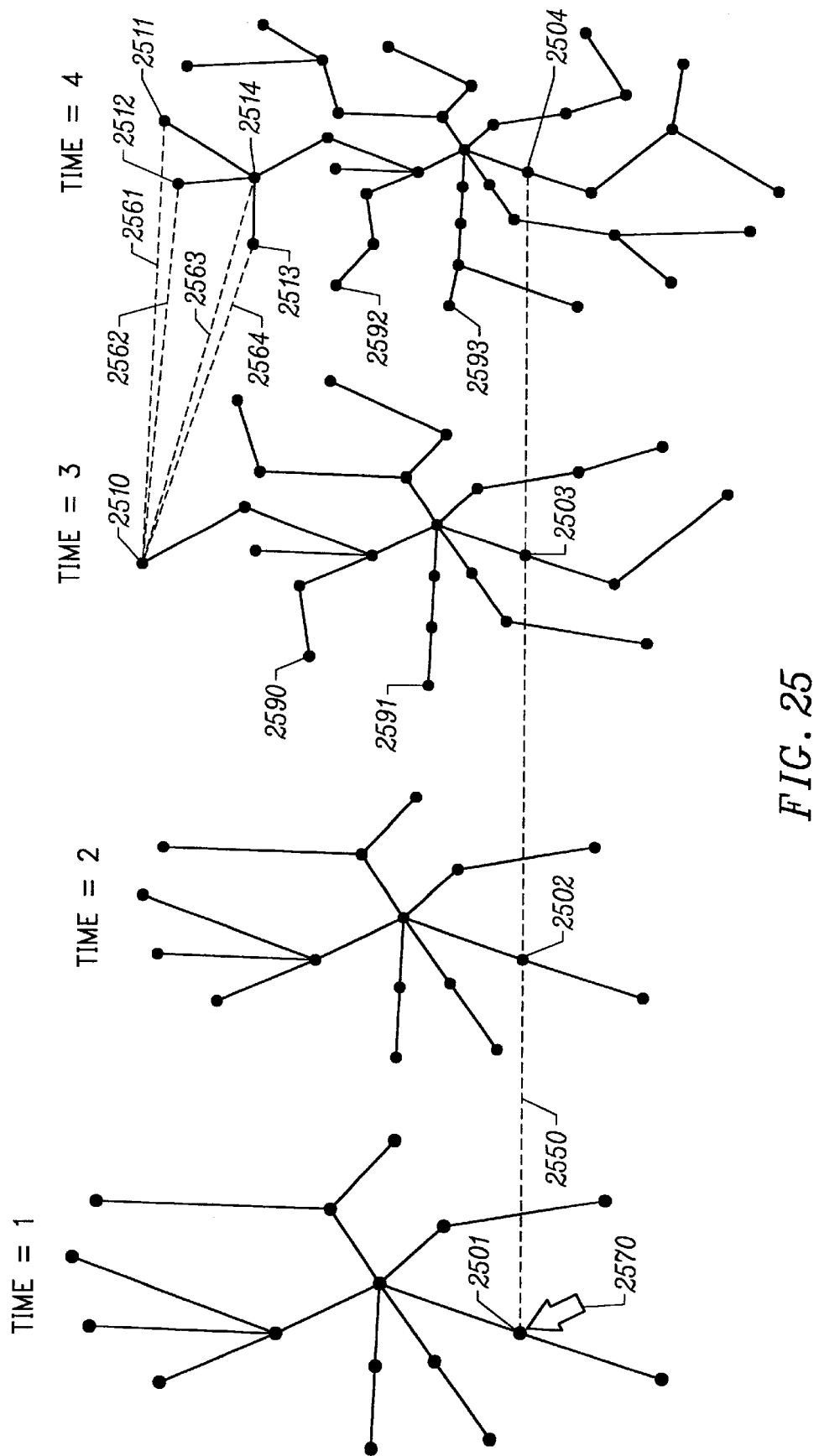
FIG. 25 illustrates a series of planar slices in a time tube illustrating a spatial contraction and addition of new nodes when interpreted with the time axis moving from left to right, and illustrating a spatial expansion and node clustering when interpreted with the time axis moving from right to left.

FIG. 25 illustrates several aspects of the methods of displaying a related series of graphs according to the present invention. FIG. 25 illustrates physical scaling of the dimensions of a series of planar slices. Points 2501, 2502, 2503, and 2504 each represent the same node. A user's cursor 2570 placed upon point 2501 causes translucent line 2550 to highlight the relationship between points 2501 through

2504. FIG. 25 also illustrates clustering or aggregation of four elements 2511 through 2514 into one element 2510 when viewed from time 4 to time 3. Translucent lines 2561 through 2564 highlight the relationship between the clustered nodes 2511 through 2514 into their resulting node 2510 at time 3. For the purpose of brevity, FIG. 25 is used to illustrate several features of the method according to the present invention. To illustrate the clustering aspect, the viewer must assume that time is flowing from the right to the left direction such that time 3 occurs after time 4. FIG. 25 also illustrates the addition of nodes at depth 3 such as nodes 2590 and 2591 at time 3 and the addition of nodes at depth 4 at time 4 such as nodes 2592 and 2593. If viewed with time flowing from the right to left direction, FIG. 25 illustrates a type of zoom which can be applied to a generalized graph structure which is displayed at time 4. For example, time 1 shows a zoomed or enlarged view of the depth 0, 1, and 2 depth nodes of the graph shown at time 4.

Additionally, time tubes according to the present invention can illustrate arbitrary generalized graphs which might include cycles. Moreover, there is no requirement that each node in each planar slice be placed in the same position as specified in the planar template. For example, translucent lines such as shown in FIG. 25 as line 2550 could alternatively be used to show correspondence of nodes rather than relying on continuity of physical placement within planar slices to indicate correspondence of nodes.

The interactive method of the preferred embodiment of the time tube aspect of the present invention allows users to interact with the visualization in various ways. For example, by clicking a button, the system rotates all of the slices so that they are being viewed head-on. Clicking on a slice brings that slice to the center focus, thus allowing viewing of that week's (or time period's) worth of data in more detail. That slice is also drawn on a transparent circular background, so the slices in the time tube are still visible. Using a "Flick-Up" gesture, the slice goes back into the time tube. Using a "Flick-Down" gesture, the slice becomes the floor (at a slight angle). The cursor control device 105 can be used to poke around in the slices. When the cursor is over a node, that node is highlighted in all of the slices. In addition, a small information area shows the details on that node. This interaction is like brushing the user's finger through the time tube, seeing the detail of the point of interest. While poking around with the mouse 105, a user can also instruct the program to notify a browser (such as Netscape) to bring up that particular page, thereby making the present invention a web-surfing tool. When the mouse 105 is activated on a particular node, the 1-hop links are also shown using blue lines. Another button changes the point of view so that the viewer is looking straight down the time tube. The viewer can also see an animation of each successive slice shown head-on. This maps the time dimension of the data into a time dimension in the visualization. Right-clicking a node zooms to the local area of that node to show more detail. Hitting the home key sends the user back the global view. This enables a "Drill-Down" operation that is of favorite among analysts. The rapid exploration of local patterns is of great interest to them.

Given the ability to visualize usage patterns on web sites, analysts can now answer some interesting questions using the methods according to the present invention. (Such as: What devolved into deadwood? When did it? Was there a correlation with a restructuring of the web site? What evolved into a popular page? When did it? Was there a correlation with a restructuring of the web site? How was usage affected by items added over time? How was usage affected by items deleted over time?) A task that analysts often perform is finding the difference between two usage patterns. Given the ability to 'see' a visual pattern, the analyst often would like to know where the greatest differences are. That is, where is the greatest increase in usage, and where is the greatest decrease in usage? Is the usage changes tied to a particular topic or area in the web site?

Another aspect of the present invention describes a novel method of visualization of both the process and result of spreading activation through a set of connected elements. Spreading activation is a generalized process that determines the effect of injecting a quantity (activation) into a network of connected elements. Specifically, spreading activation is performed by multiplying a flow matrix M that represents the strength of connections by an activation vector A(t) to obtain a new vector A(t+1). Using disk trees and times tubes according to the present invention, the process of spreading activation can be visualized.

The present invention solves the problem of how to communicate to a user the possible relevance of a set of networked documents and how that relevance was determined. It is especially useful for a large collection of documents.

According to the present invention, degree of interest is predicted using spreading activation, and that spreading activation is visualized in order to make it understandable to the user. By poking at the places in the network with the cursor and watching the activation spread the user can understand linkages not possible with a static display.

A very practical application of the present invention is to one's own or a competitor's web site. More generally, it is applicable to any network that can be roughly approximated by a tree. The present invention enables web site visualization, and thereby provide competitive intelligence for web site administrator and designers.

In the spreading activation algorithm, an activation network embedded in a generalized graph structure is modeled as an activation matrix R. The activation matrix R is square because each node has a column and row dedicated to it. Each off-diagonal element $R_{i,j}$ the strength of association of node j to node i, and the diagonal contains zeros. The strengths in the R matrix determine how much activation flows from each node to each other node during an activation iteration. The input activation being introduced into the generalized graph structure is represented by an activation input vector C, where $C_i$ represents the activation pumped into node i during each iteration. The dynamics of activation is modeled over discrete time steps t=1, 2, . . . N, with activation at step t represented by a vector A(t), with element $A_i(t)$ representing the activation level at node i at step t. The time evolution of the flow of activation is determined by the following iteration equation.

$$A(t)=C+MA(t-1)$$

In the above spreading activation iteration equation, M is a flow matrix that determines the flow and decay of activation among nodes. The flow matrix M is specified the following equation.

$$M=(1-g)I+aR$$

In the above equation, 0<g<1, and g is a parameter determining the relaxation of node activity back to zero when it receives no additional activation input, and a is a parameter denoting the amount of activation spread from a node to its neighbors. I is the identity matrix.

As discussed above, disk trees are a two dimensional representation of a collection of connected items. In the case of the web analysis tool, the items are web pages, and the connections are hyperlinks that exist between documents. The plane perpendicular to a disk tree may be used to encode the frequency with which a page was visited when the page is selected. When applied to spreading activation according to the present invention, the plane perpendicular to the Disk Tree encodes the amount of activation each node receives, also called an activation bar. The number of elements that show the corresponding spreading activation value is variable. The number of elements to display can be determined by, but is not limited to the following methods: predetermined (as in the case where the spreading activation values are shown for the top 100 documents), based upon the top specified percentage, or a predefined threshold. The color of each activation bar is not limited to one color according to the present invention, but can be a color gradient or a set of different colors depending upon the value of activation. Various networks can be used to spread activation. In a web site analysis tool according to the present invention, content, usage, and topology networks are used, but other networks, such as recommendations, can also be employed. Activation can be simultaneously spread through one or more pages and simultaneously spread through one or more networks.

One of the more powerful functions a visualization of spreading activation can perform is revealing the results of spreading activation through different networks. Additionally, when networks are combined using a weighting scheme, the contribution of each network on the resulting activation of a page can be assessed by using different colors for each network in the activation bar. The effect of using different underlying flow networks (such as content and usage) can be determined by subtracting the resulting activation patterns from each network and displaying the difference.

Since the visualization is interactive, the amount of activation to spread through the network can be determined by the amount of time the cursor spends on a page. This process is referred to as dwell time. The set of pages to use for pumping activation input can be determined by the history of pages the user has selected in the visualization or through some other means (such as a text window that displays the current activation sources that users can drag and drop pages into and out of). Finally, the set of pages can be determined by a sort of "fuzzy brushing," where the pages are determined by a selected page's neighbors (as measured by the hyperlink structure, content, usage, or any other metrics). The features of visualization of spreading activation results according to the present invention are more fully elucidated described below.

Figure 26:
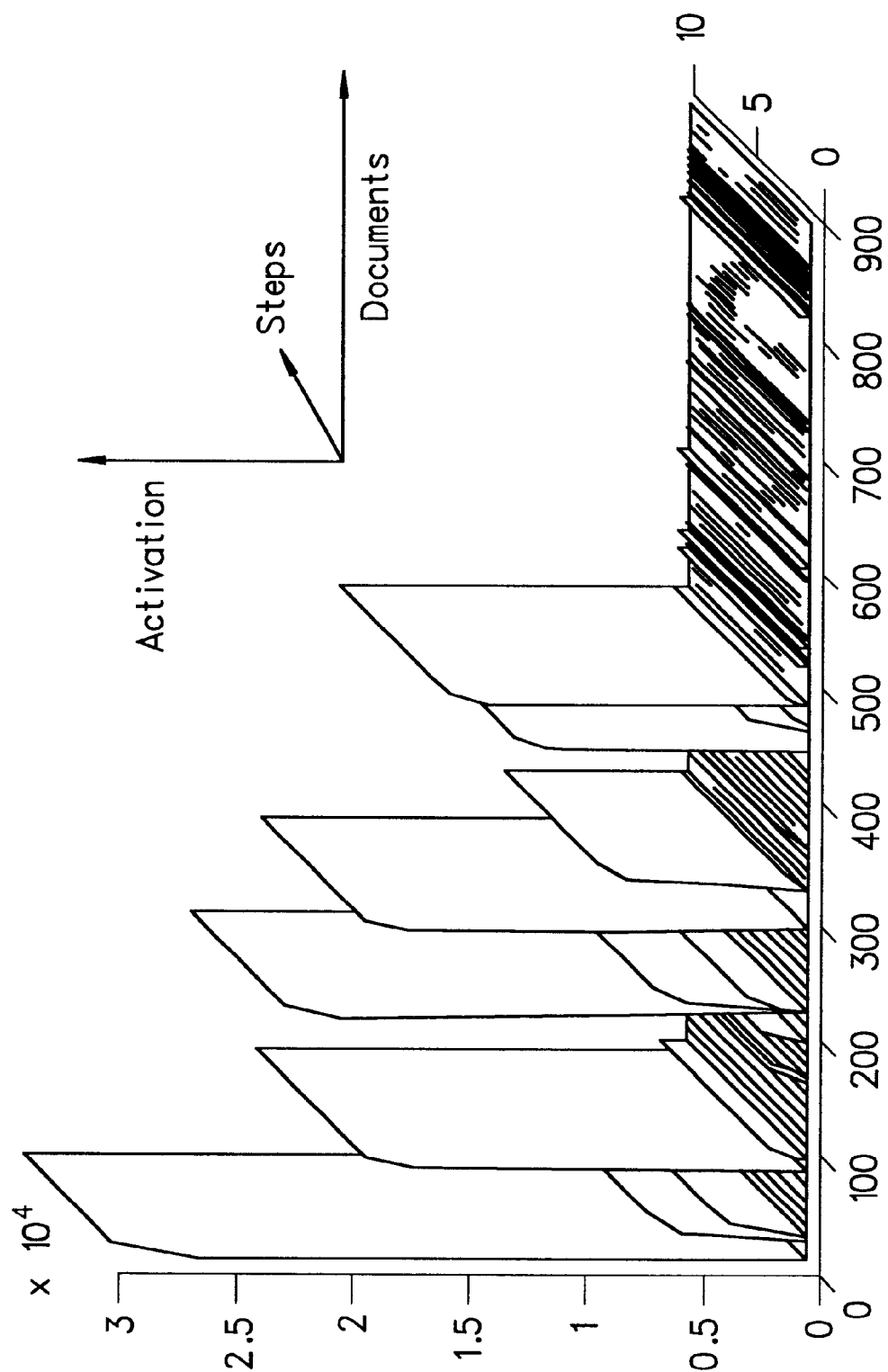
FIG. 26 illustrates activation levels of web pages during spreading activation algorithm as displayed by a conventional mathematics package.

FIG. 26 illustrates spreading activation as modeled in Matlab (a conventional mathematics package). The x-axis represents the individual documents ordered by a breadth first search of the Xerox Web site, the y-axis represents the amount of activation each document receives, and the z-axis represents each step in spreading activation process. The result of the process is a vector, which can be visualized in Matlab as a two-dimensional plot.

The iterative process of spreading activation can be visualized using time tubes according to the present invention. Each successive disk tree (also called planar slice) of the time tube is used to show the resulting activation at each stage of the activation process. For this purpose, the activation bars are not the preferred method for displaying activation, because the plane perpendicular to each disk tree is used to encode the transformation. Instead, the color of each node in the disk tree is used to display the activation values. Visualizing spreading activation with time tubes enables the user to identify and analyze interesting events in the algorithm, such as the identification of phase shifts. A phase shift occurs when the change in activation at a node in successive steps of the spreading activation algorithm reverses its sign.

Figure 27:
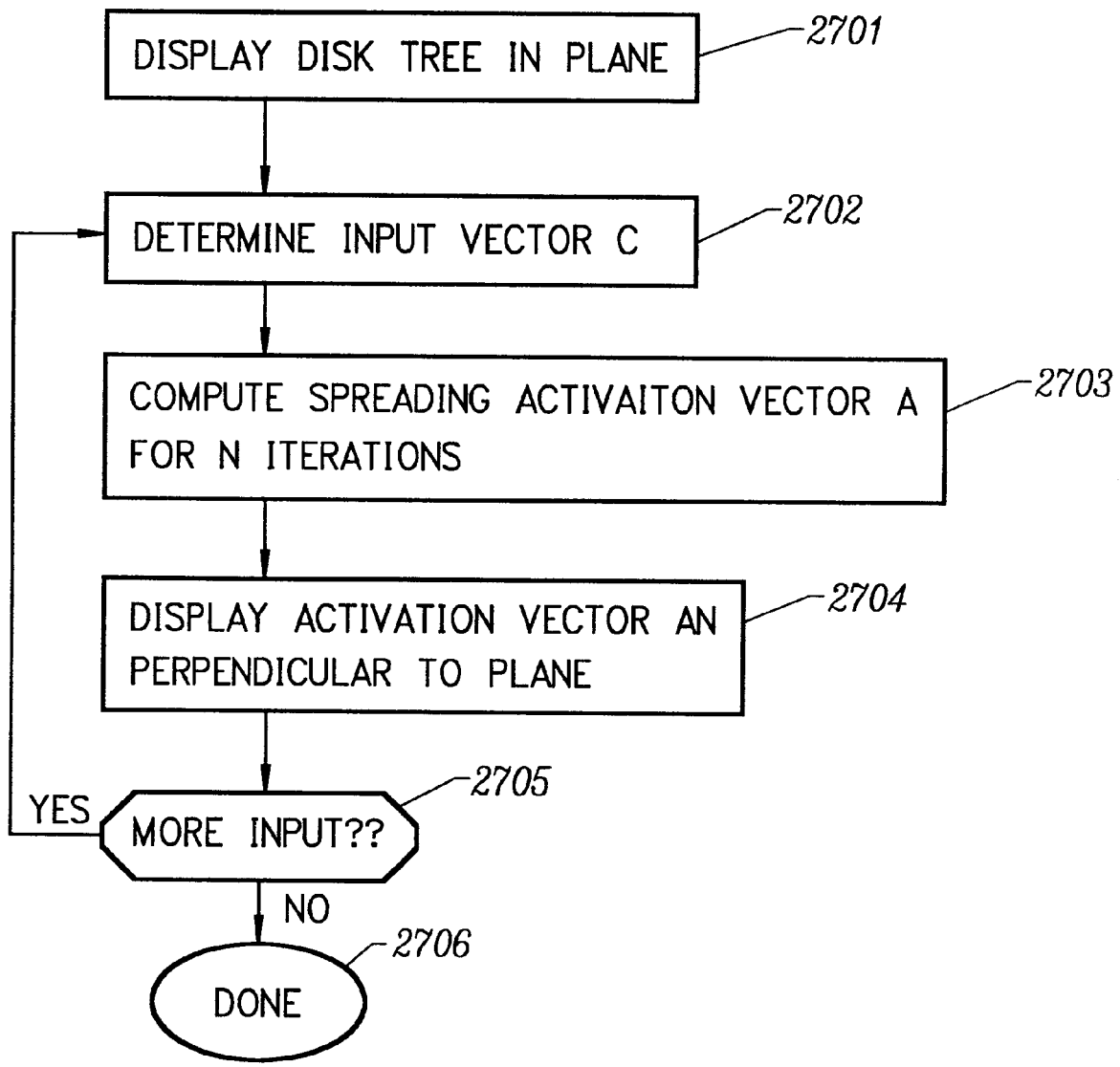
FIG. 27 illustrates a method for interactively receiving activation input and displaying results of a spreading activation algorithm according to the present invention.

FIG. 27 illustrates a method of displaying results of a spreading activation algorithm pertaining to a generalized graph structure according to the present invention. In step 2701, a disk tree is displayed in a plane. At step 2702, the input vector C of the spreading activation algorithm is determined. At step 2703, the spreading activation vector A is iteratively computed over N iterations. At step 2704, the final activation vector A(N) is displayed perpendicular to the plane of the disk tree. At step 2705, the method 2700 determines whether or not there is more input for the spreading activation algorithm. If more input exists, then branch 2750 takes the method back to step 2702 so that a new activation input vector C can be used. If there is no more input at step 2705, then branch 2751 causes the method to exit at step 2706.

Figure 28:
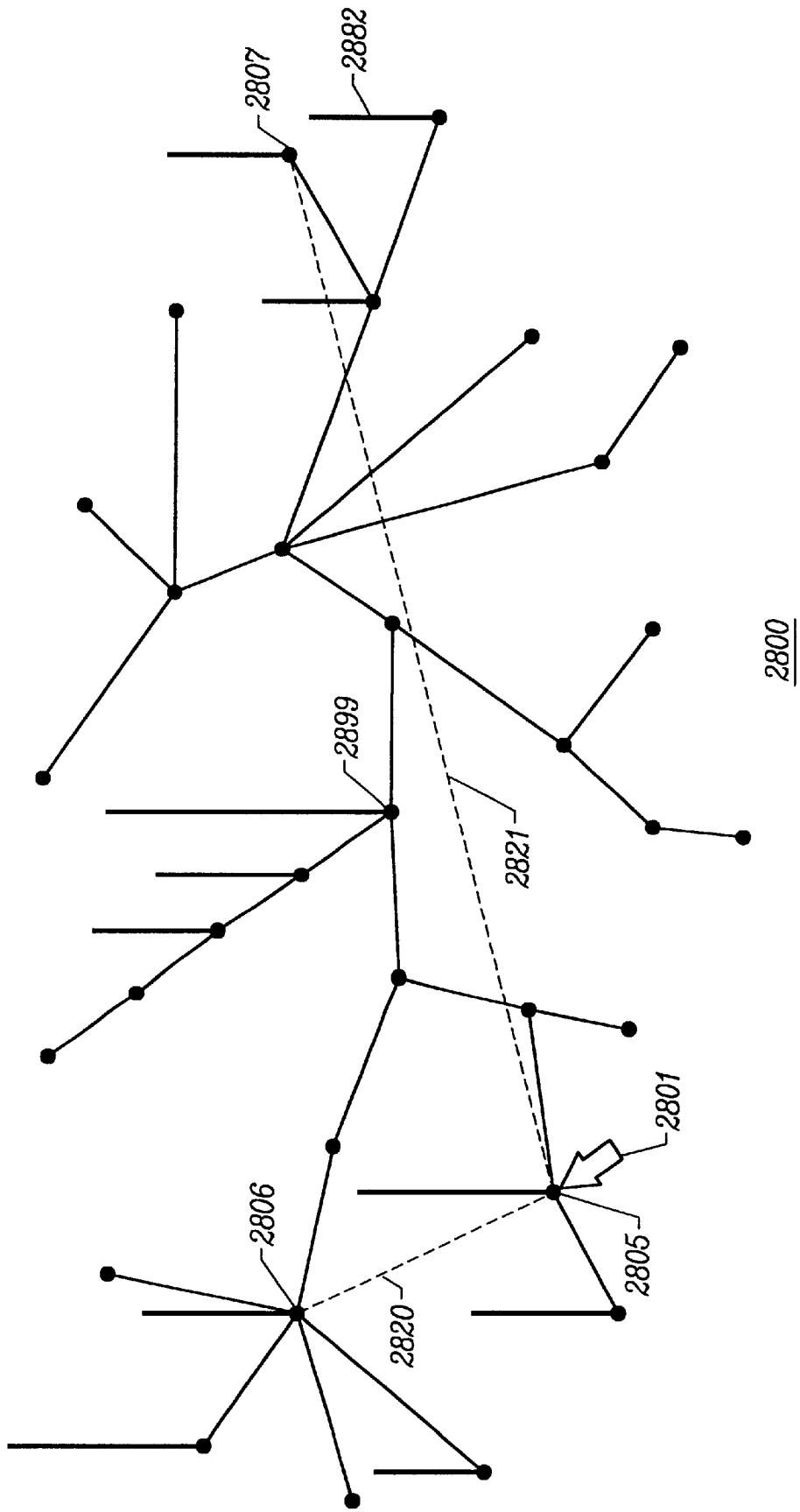
FIG. 28 illustrates a display of a spreading activation results and specification of new activation input according to the method shown in FIG. 26.

FIG. 28 illustrates the method of displaying results of a spreading activation algorithm according to the present invention. According to the present invention, activation input can be specified by a variety of interactive manners. For example, as illustrated in FIG. 28, a cursor 2801 can be placed on a displayed node 2805 causing activation input to be cumulatively added over time to this node. For example, the longer that the cursor 2801 stays on node 2805, the more activation input is generated for that node. In another variation, the cursor must be placed on a node and the node selected, such as by pushing a mouse button, for activation input to begin to accumulate on the node. Once the user has added activation at a node, he may then move the cursor 2801 to another node and begin to add activation at that other node while still maintaining the activation input that was generated for the previously selected node. For example, in FIG. 28, the user had added activation input to the root node 2899 by placing his cursor on the root node and selecting the root node for a certain amount of time, and then the user moved his cursor 2801 over to node 2805 and began to add additional activation input to node 2805 without affecting the activation input which was previously defined for the root node 2899. At all times, the display 2800 reflects the final activation vector A(N) which results from the then existing activation input vector C. Thus, the N-step iterative spreading activation algorithm is continuously performed as long as a new activation input vector C is generated by changing the amount of activation input for any node in the generalized graph structure. Although FIG. 28 shows a disk tree representation of a generalized graph structure, as discussed above many links which exist in the generalized graph structure may be omitted from the tree structure displayed. Therefore, according to another aspect of the method of displaying results of a spreading activation algorithm according to the present invention, whenever a user selects a node translucent lines will appear, which show omitted links in the generalized graph structure. For example, in FIG. 28, the user has selected node 2805, and translucent lines 2820 and 2821 connect node 2805 to nodes 2806 and 2807 respectively. Translucent lines 2820 and 2821 represent links which exist in the generalized graph structure which were omitted in the tree structure. These translucent lines 2820 and 2821 may assist a user in understanding how activation has spread from the nodes to which activation input was added to those nodes to which activation has spread. For example, some of the activation which was added at 2805 probably spread through to node 2807 through the link 2821, which was not shown in the tree structure. Another mechanism by which activation input can be added to a node is by selecting the node and then typing in an amount of activation to add. At any time, the user may reset the activation input vector C and start adding activation input from zero again. The interactive nature of the display of the final activation and the formation of an activation input vector through the measuring of the dwell time of a cursor on a node provides a dynamic simulation of flow networks which greatly helps a user understand the dynamics of a generalized graph structure.

Figure 29:
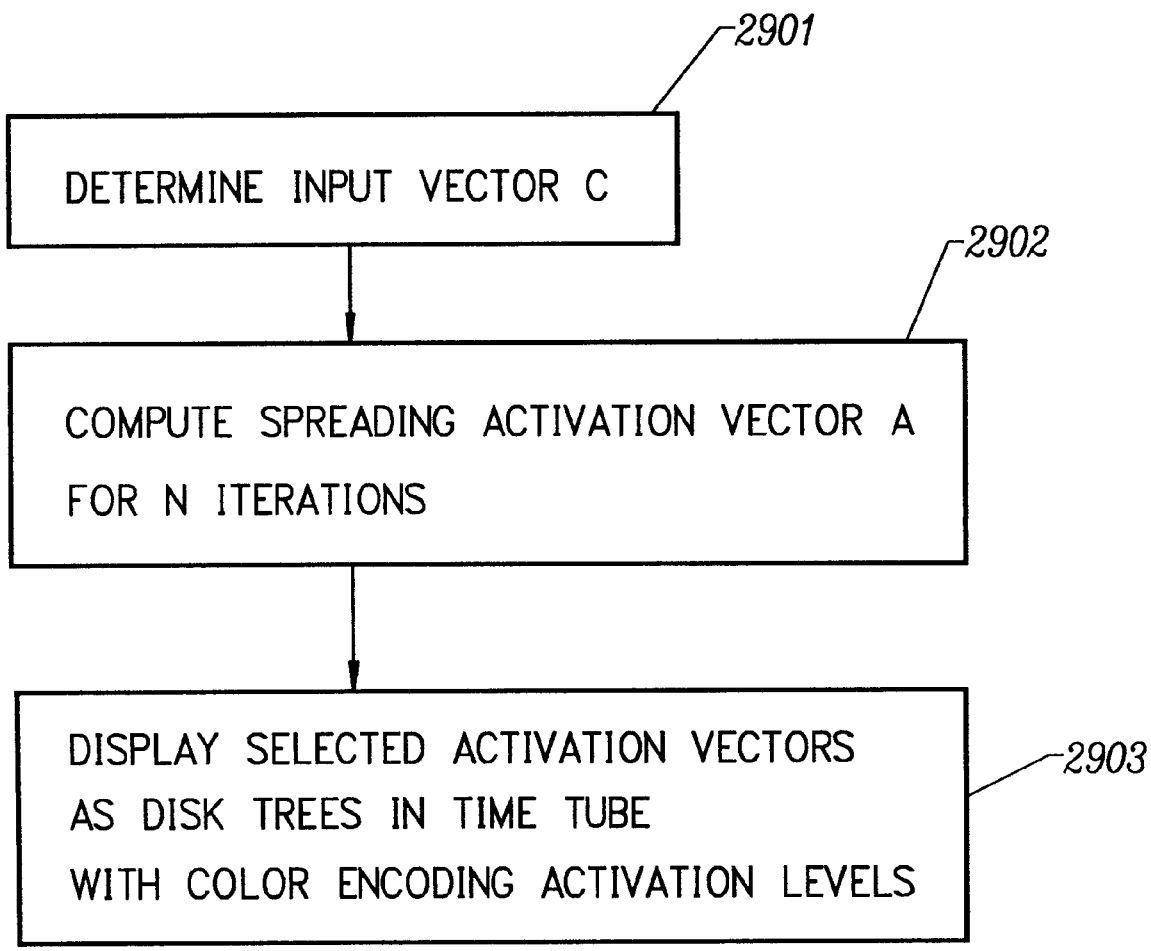
FIG. 29 illustrates a method according to the present invention of displaying the process of spreading activation in a series of planar slices of a time tube.

FIG. 29 illustrates a method of displaying the state of the activation vector A(t) during the N iterations (rather than only at the end of the N iterations as described with reference to FIG. 28). Once the input vector C has been determined at step 2901, the spreading activation vector A is computed over N iterations, and the spreading activation vector A(t) is saved at some or all of the iterative steps (some or all value of t from 0 to N) at step 2902. At step 2903, selected activation vectors are displayed as disk trees in time tubes having the activation level at various nodes and/or links color encoded into the planar slices which make up the time tube. As an alternative embodiment, the activation vectors at various time steps of the spreading activation algorithm may be displayed as activation bars which are coincident with the time axis of the time tube, so long as sufficient spacing in the time dimension between the planar slices exist so that activation bars do not cross into adjacent planar slices of the time tube. This is illustrated in FIG. 30.

Figure 30:
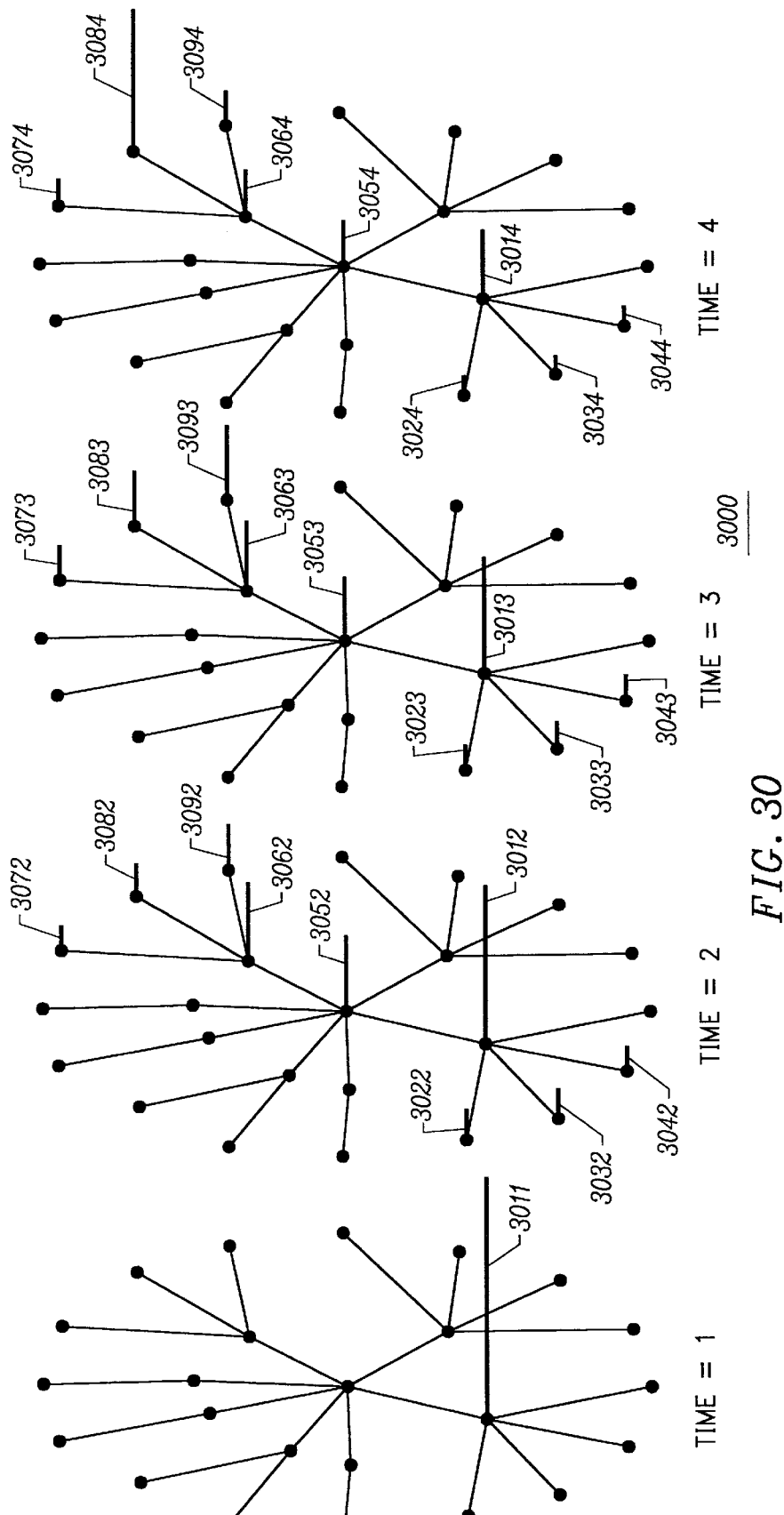
FIG. 30 illustrates a display of the process of spreading activation in a series of planar slices of a time tube generated according to the method shown in FIG. 28 of the present invention.

In FIG. 30, a large amount of activation is added to node 3011 at time 1. At time 2, some of that activation has spread to nodes 3022, 3032, 3042, 3052, 3072, 3062, 3082, and 3092. By time 4, the final activation vector A(N) is illustrated. A large amount of activation wound up on node 3084 at the end of the N iterations. Because the spreading activation algorithm (when used with a suitable flow matrix M) produces a final activation vector A(N) that was converged upon asymptotically, it may be useful to show earlier iterations more frequently than later iterations, because there will be less change in the later iterations. Alternatively, the iterations chosen for display can be based upon where the largest amount of change occurred, or can be based on the phase shifts detected during the spreading activation algorithm, or of course all N-1 intermediate activation vectors can be displayed. In the disk tree display illustrated in FIG. 28 and the time tube display illustrated in FIG. 30, more than one activation vector may be computed and displayed. For example, a web site analyst might want to display the difference between a recommended usage pattern and an observed usage pattern by spreading the same activation input vector C through two separate flow matrices M1 and M2, and then displaying the difference between the resulting final activation vectors on the disk tree. Of course, the process of computing this difference can be illustrated on a time tube such as illustrated in FIG. 30.

Furthermore, weighted combinations of different flow matrices M1 and M2 may be computed and the results displayed on a time tube or disk tree such that activation bars representing activation vectors are segmented such that a user can see what part of each level of activation was contributed by which flow matrix.

Given the infancy of the web, it is not surprising that the interactions and relationships within web ecologies are not very well understood. As the world wide web continues to grow both in the number of users and the number of documents made accessible, the problem of understanding the correlations between the producers of the information, the characteristics of the information, and the users of the information will most likely remain.

The visualization methods according to the present invention expand the capabilities of web analysis programs in the amount of data they are able to display as well as making the evolutionary patterns of web ecologies more apparent.

While the various aspects of the present invention have been described with reference to several aspects and their embodiments, those embodiments are offered by way of example, not be way of limitation. The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical applications to thereby enable others skilled in the art to best utilize the invention in various embodiments and with various modifications as are suited to the particular use contemplated. Those skilled in the art will be enabled by this disclosure will be enabled by this disclosure to make various obvious additions or modifications to the embodiments described herein; those additions and modifications are deemed to lie within the scope of the present invention. It is intended that the scope of the invention be defined by the claims appended hereto.

What is claimed is:

1. A method for displaying a related series of graphs, the method comprising the steps of:
   (a) creating an inventory of all unique nodes within the related series of graphs;
   (b) assigning each unique node a unique layout position within a planar template based upon the inventory;
   (c) creating a series of planar slices corresponding to the related series of graphs by placing each node of each graph into a planar slice corresponding to each graph at its unique layout position within the planar template; and
   (d) simultaneously displaying the series of planar slices.

2. A method as in claim 1, wherein the planar slices are circular in shape.

3. A method as in claim 2, wherein the series of graphs comprises a series of tree structures.

4. A method as in claim 3, wherein the planar slices comprise disk trees.

5. A method for displaying a related series of graphs, the method comprising the step of:
   (a) creating an inventory of all unique nodes within the related series of graphs;
   (b) assigning each unique node a unique layout position within a planar template based upon the inventory;
   (c) creating a series of planar slices corresponding to the related series of graphs by placing each node of each graph into a planar slice corresponding to each graph at its unique layout position within the planar template; and
   (d) simultaneously displaying the series of planar slices, wherein the planar slices comprise squashed cone trees.

6. A method for displaying a related series of graphs, the method comprising the steps of:
   (a) creating an inventory of all unique nodes within the related series of graphs;
   (b) assigning each unique node a unique layout position within a planar template based upon the inventory;

(c) creating a series of planar slices corresponding to the related series of graphs by placing each node of each graph into a planar slice corresponding to each graph at its unique layout position within the planar template;

(d) simultaneously displaying the series of planar slices; wherein the planar slices are circular in shape; and, wherein step (d) comprises the step of:

laying out the planar slices substantially parallel to one another within a cylindrical display region so that each planar slice appears elliptical.

7. A method for displaying a related series of graphs, the method comprising the steps of:

(a) creating an inventory of all unique nodes within the related series of graphs;

(b) assigning each unique node a unique layout position within a planar template based upon the inventory;

(c) creating a series of planar slices corresponding to the related series of graphs by placing each node of each graph into a planar slice corresponding to each graph at its unique layout position within the planar template; and (d) simultaneously displaying the series of planar slices; wherein each planar slice is scaled in physical dimension relative to another planar slice.

8. A method for displaying a related series of graphs, the method comprising the steps of:

(a) creating an inventory of all unique nodes within the related series of graphs;

(b) assigning each unique node a unique layout position within a planar template based upon the inventory;

(c) creating a series of planar slices corresponding to the related series of graphs by placing each node of each graph into a planar slice corresponding to each graph at its unique layout position within the planar template;

(d) simultaneously displaying the series of planar slices; and, wherein each node within each graph has a value associated with it which is color encoded on the planar graph.

9. A method for displaying relationships between nodes from among a related series of graphs, the method comprising the steps of:

(a) creating a series of planar slices corresponding to the related series of graphs;

(b) simultaneously displaying the series of planar slices substantially parallel to one another; and (c) linking corresponding nodes in the series of planar slices.

10. A method as in claim 9, wherein step (c) comprises the step of:

(d) when a user's cursor is placed over a node in a planar slice, linking the node's corresponding nodes in the series of planar slices.

11. A method as in claim 9, wherein step (c) comprises the step of:

(e) when a plurality of nodes in one planar slice corresponds to a single node in an adjacent planar slice, linking the plurality of nodes to the single node in the adjacent planar slice.

12. A computer readable storage medium comprising:

computer readable program code embodied on said computer readable storage medium, said computer readable program code for programming a computer to perform a method for displaying a related series of graphs, the method comprising the steps of:

(a) creating an inventory of all unique nodes within the related series of graphs;

(b) assigning each unique node a unique layout position within a planar template based upon the inventory;

(c) creating a series of planar slices corresponding to the related series of graphs by placing each node of each graph into a planar slice corresponding to each graph at its unique layout position within the planar template; and (d) simultaneously displaying the series of planar slices.

13. A computer readable storage medium comprising computer readable program code as in claim 12, wherein the planar slices are circular in shape.

14. A computer readable storage medium comprising computer readable program code as in claim 13, wherein the series of graphs comprises a series of tree structures.

15. A computer readable storage medium comprising computer readable program code as in claim 14, wherein the planar slices comprise disk trees.

16. A computer readable storage medium comprising:

computer readable program code embodied on said computer readable storage medium, said computer readable program code for programming a computer to perform a method for displaying a related series of graphs, the method comprising the steps of:

(a) creating an inventory of all unique nodes within the related series of graphs;

(b) assigning each unique node a unique layout position within a planar template based upon the inventory;

(c) creating a series of planar slices corresponding to the related series of graphs by placing each node of each graph into a planar slice corresponding to each graph at its unique layout position within the planar template;

(d) simultaneously displaying the series of planar slices;

wherein the series of graphs comprises a series of tree structures; and, wherein the planar slices comprise squashed cone trees.

17. A computer readable storage medium comprising:

computer readable program code embodied on said computer readable storage medium, said computer readable program code for programming a computer to perform a method for displaying a related series of graphs, the method comprising the steps of:

(a) creating an inventory of all unique nodes within the related series of graphs;

(b) assigning each unique node a unique layout position within a planar template based upon the inventory;

(c) creating a series of planar slices corresponding to the related series of graphs by placing each node of each graph into a planar slice corresponding to each graph at its unique layout position within the planar template;

(d) simultaneously displaying the series of planar slices;

wherein the planar slices are circular in shape; and, wherein step (d) comprises the step of:

laying out the planar slices substantially parallel to one another within a cylindrical display region so that each planar slice appears elliptical.

18. A computer readable storage medium comprising: computer readable program code embodied on said computer readable storage medium, said computer readable program code for programming a computer to perform a method for displaying a related series of graphs, the method comprising the steps of:

(a) creating an inventory of all unique nodes within the related series of graphs;

(b) assigning each unique node a unique layout position within a planar template based upon the inventory;

(c) creating a series of planar slices corresponding to the related series of graphs by placing each node of each graph into a planar slice corresponding to each graph at its unique layout position within the planar template;

(d) simultaneously displaying the series of planar slices; and, wherein each planar slice is scaled in physical dimension relative to another planar slice.

19. A computer readable storage medium comprising computer readable program code as in claim 12, wherein each node within each graph has a value associated with it which is color encoded on the planar graph.

20. A computer readable storage medium comprising:

computer readable program code embodied on said computer readable storage medium, said computer readable program code for programming a computer to perform a method for displaying relationships between nodes from among a related series of graphs, the method comprising the steps of:

(a) creating a series of planar slices corresponding to the related series of graphs;

(b) simultaneously displaying the series of planar slices substantially parallel to one another; and (c) linking corresponding nodes in the series of planar slices.

21. A computer readable storage medium comprising computer readable program code as in claim 20, wherein step (c) comprises the step of:

(d) when a user's cursor is placed over a node in a planar slice, linking the node's corresponding nodes in the series of planar slices.

22. A computer readable storage medium comprising computer readable program code as in claim 20, wherein step (c) comprises the step of:

(e) when a plurality of nodes in one planar slice corresponds to a single node in an adjacent planar slice, linking the plurality of nodes to the single node in the adjacent planar slice.

23. An apparatus for displaying a related series of graphs, comprising:

a processor;

a display device coupled to the processor; and a processor readable storage medium coupled to the processor containing processor readable program code for programming the apparatus to perform a method for displaying the related series of graphs, the method comprising the steps of:

(a) creating an inventory of all unique nodes within the related series of graphs;

(b) assigning each unique node a unique layout position within a planar template based upon the inventory;

(c) creating a series of planar slices corresponding to the related series of graphs by placing each node of each graph into a planar slice corresponding to each graph at its unique layout position within the planar template; and (d) simultaneously displaying the series of planar slices.

24. An apparatus for displaying relationships between nodes from among a related series of graphs, comprising:

a processor;

a display device coupled to the processor; and a processor readable storage medium coupled to the processor containing processor readable program code for programming a computer to perform a method for displaying relationships between nodes from among a related series of graphs, the method comprising the steps of:

(a) creating a series of planar slices corresponding to the related series of graphs;

(b) simultaneously displaying the series of planar slices substantially parallel to one another; and (c) linking corresponding nodes in the series of planar slices.

* * * * *

UNITED STATES PATENT AND TRADEMARK OFFICE
CERTIFICATE OF CORRECTION

| | |
|---|---|
| PATENT NO. | : 6,369,819 B1 |
| APPLICATION NO. | : 09/062513 |
| DATED | : April 9, 2002 |
| INVENTOR(S) | : James E Pitkow et al. |

It is certified that error appears in the above-identified patent and that said Letters Patent is hereby corrected as shown below:

Column 1, line 15, insert as a new paragraph:

This invention was made with Government support under N00014-96-C-0097 awarded by ONR. The Government has certain rights in this invention.

Signed and Sealed this

Eighteenth Day of March, 2008

JON W. DUDAS
*Director of the United States Patent and Trademark Office*